US012553854B2

(12) United States Patent
Lee et al.

(10) Patent No.: US 12,553,854 B2
(45) Date of Patent: Feb. 17, 2026

(54) DEVICE AND METHOD FOR DETECTING MINIATURE TARGETS IN A FLUID SAMPLE

(71) Applicant: Taiwan Semiconductor Manufacturing Company, Ltd., Hsin-Chu (TW)

(72) Inventors: Wei Lee, Hsinchu (TW); Katherine H. Chiang, New Taipei (TW); Pei-Wen Liu, Hsinchu (TW); Ke-Wei Su, Hsinchu County (TW); Kuan-Lun Cheng, Hsin-Chu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 706 days.

(21) Appl. No.: 17/876,695

(22) Filed: Jul. 29, 2022

(65) Prior Publication Data

US 2024/0036000 A1 Feb. 1, 2024

(51) Int. Cl.
*G01N 27/403* (2006.01)
*G01N 27/414* (2006.01)

(52) U.S. Cl.
CPC ..... *G01N 27/4035* (2013.01); *G01N 27/4145* (2013.01); *G01N 27/4148* (2013.01)

(58) Field of Classification Search
CPC ........... G01N 27/4035; G01N 27/4145; G01N 27/4148
See application file for complete search history.

(56) References Cited

U.S. PATENT DOCUMENTS

| 8,601,416 | B2 | 12/2013 | Kuo et al. |
| 8,605,523 | B2 | 12/2013 | Tao et al. |
| 8,630,132 | B2 | 1/2014 | Cheng et al. |
| 8,760,948 | B2 | 6/2014 | Tao et al. |
| 8,762,900 | B2 | 6/2014 | Shin et al. |
| 8,775,993 | B2 | 7/2014 | Huang et al. |
| 8,887,116 | B2 | 11/2014 | Ho et al. |
| 2014/0032871 | A1 | 1/2014 | Hsu et al. |
| 2014/0101623 | A1 | 4/2014 | Chen et al. |
| 2014/0153321 | A1 | 6/2014 | Liaw |
| 2014/0153345 | A1 | 6/2014 | Kim et al. |
| 2014/0177352 | A1 | 6/2014 | Lum |
| 2014/0201692 | A1 | 7/2014 | Chen et al. |
| 2014/0233330 | A1 | 8/2014 | Ko et al. |

(Continued)

*Primary Examiner* — Jacob Y Choi
*Assistant Examiner* — Neil R Prasad
(74) *Attorney, Agent, or Firm* — HAYNES AND BOONE, LLP

(57) ABSTRACT

A substrate has a first side and a second side vertically opposite to the first side. A sensing transistor is disposed at least in part over the first side of the substrate. A plurality of voltage reference transistors is disposed at least in part over the first side of the substrate. The voltage reference transistors are disposed on different lateral sides of the sensing transistor. A structure is disposed over the second side of the substrate. The structure defines one or more openings configured to collect a fluid. A sensing film is disposed over the second side of the substrate, wherein the sensing transistor is configured to detect, at least in part through capacitive coupling, a presence of one or more predefined miniature targets in the fluid that attach to the sensing film in the opening that is vertically aligned with the sensing transistor.

20 Claims, 35 Drawing Sheets

(56) References Cited

U.S. PATENT DOCUMENTS

| | | |
|---|---|---|
| 2014/0237435 A1 | 8/2014 | Chen et al. |
| 2014/0241077 A1 | 8/2014 | Katoch et al. |
| 2014/0269114 A1 | 9/2014 | Yang et al. |
| 2014/0282337 A1 | 9/2014 | Yuh et al. |
| 2014/0304670 A1 | 10/2014 | Su et al. |
| 2014/0310675 A1 | 10/2014 | Liu et al. |
| 2014/0325464 A1 | 10/2014 | Hsu et al. |
| 2016/0265047 A1* | 9/2016 | van Rooyen ...... G01N 27/4148 |
| 2020/0173958 A1* | 6/2020 | Chiang .............. G01N 33/5438 |
| 2021/0278396 A1* | 9/2021 | Goldsmith ......... G01N 33/5438 |

* cited by examiner

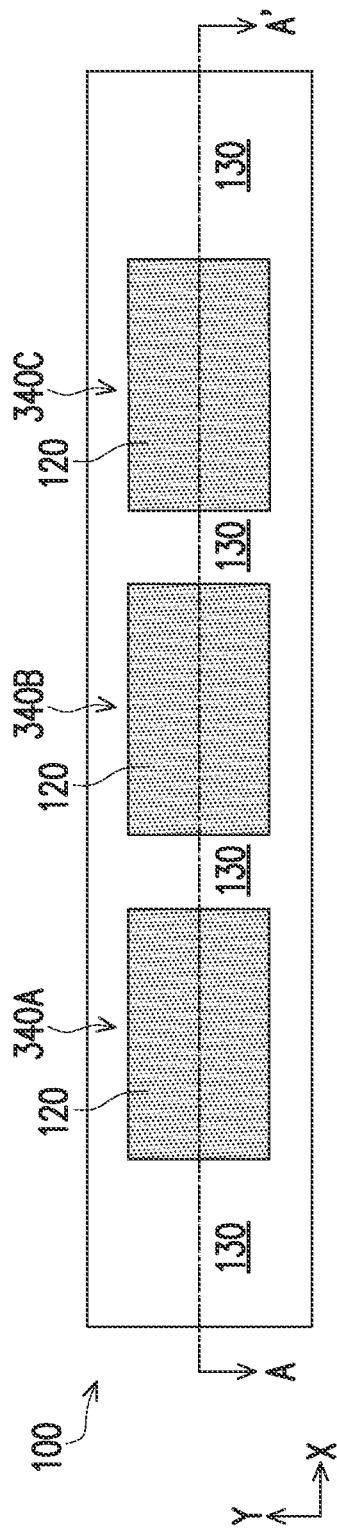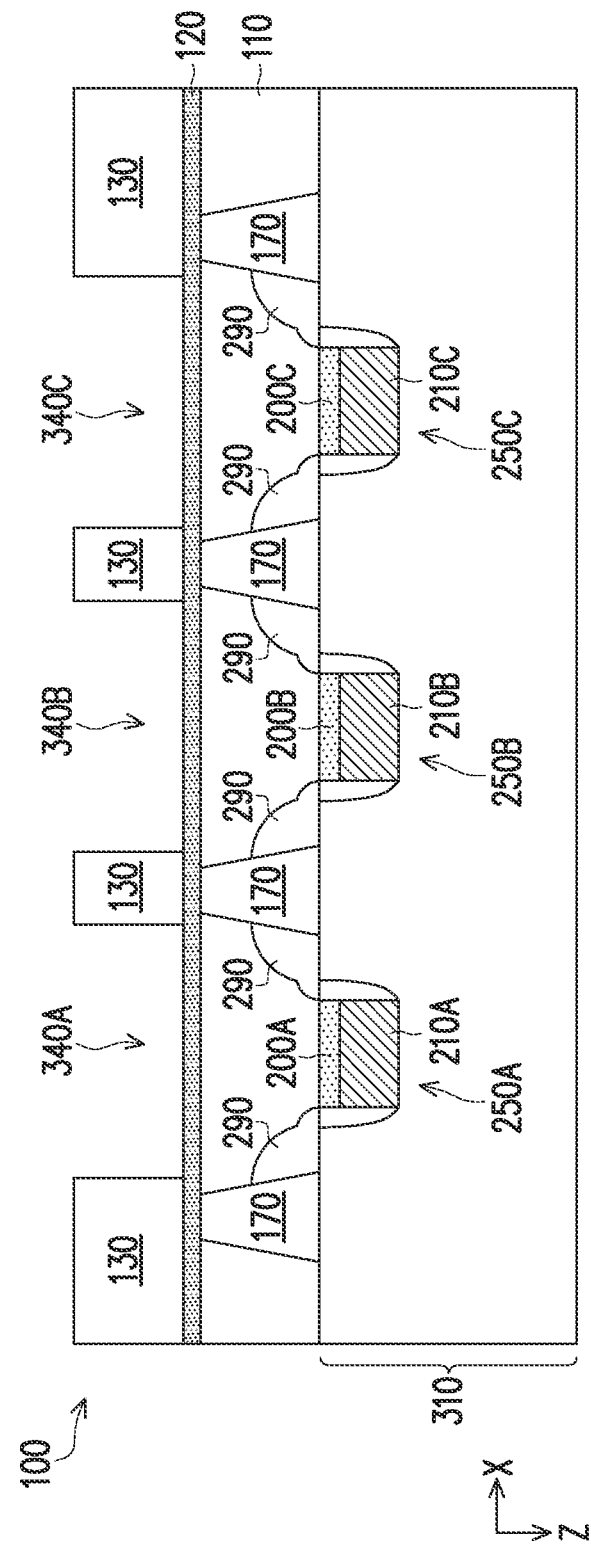
FIG. 12B
FIG. 12A

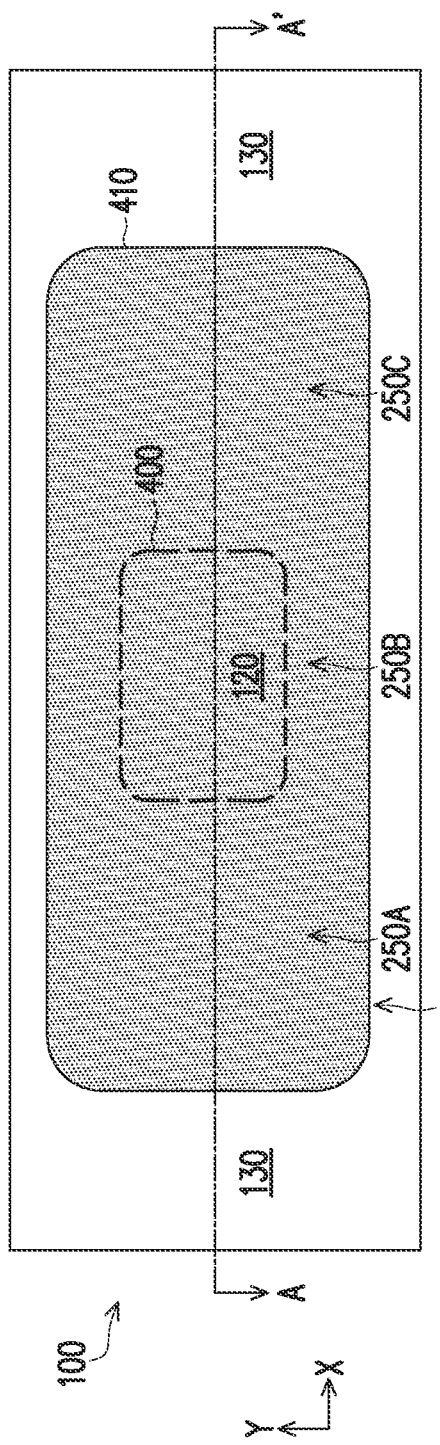
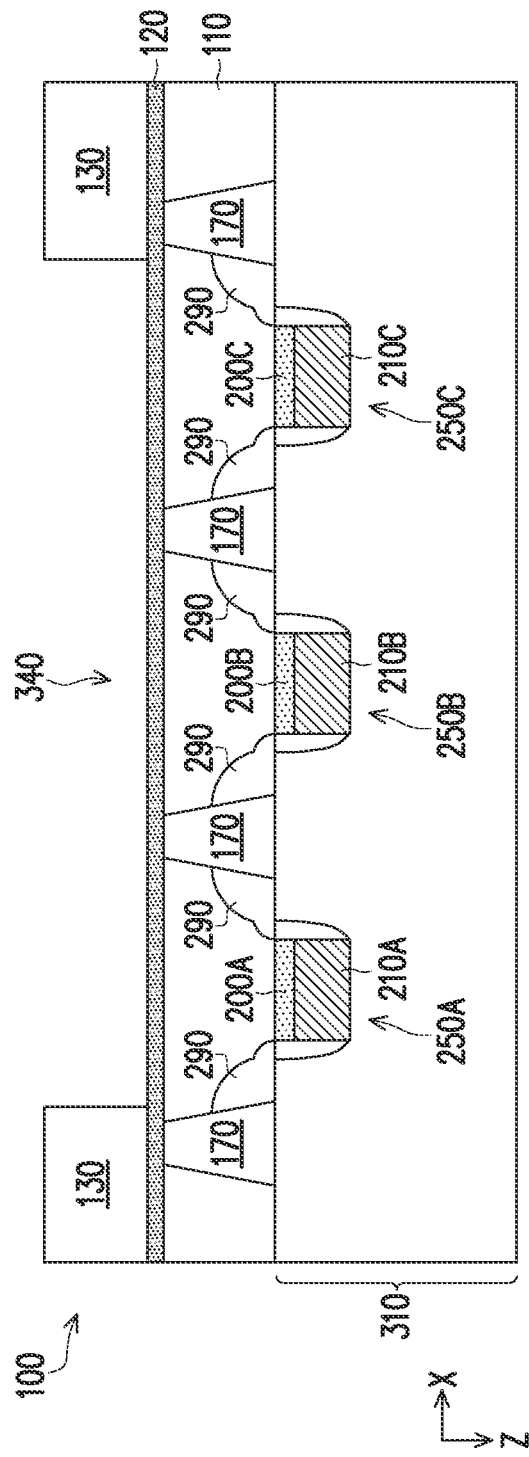

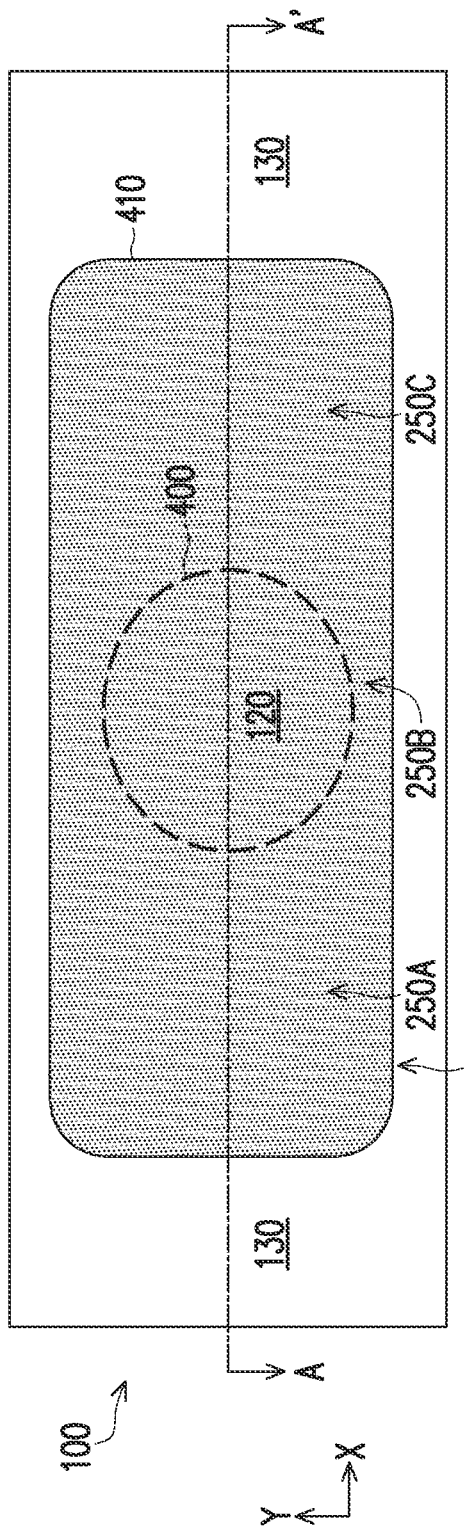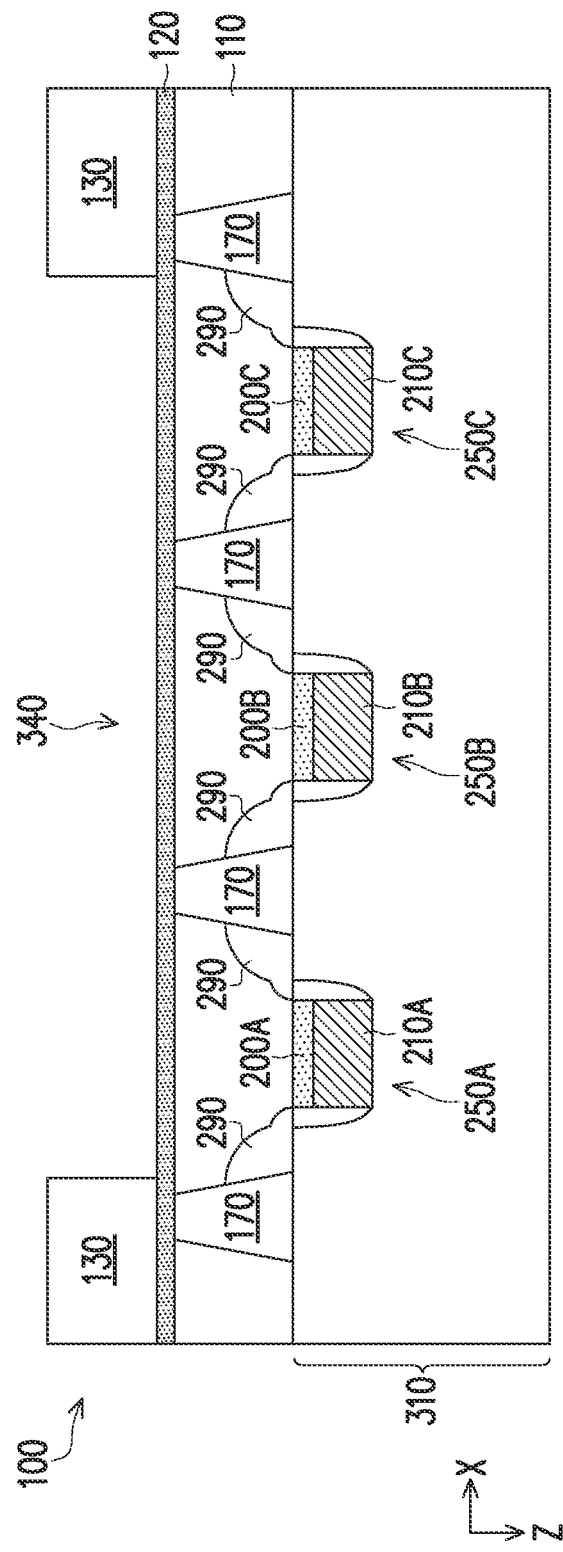
FIG. 15B
FIG. 15A

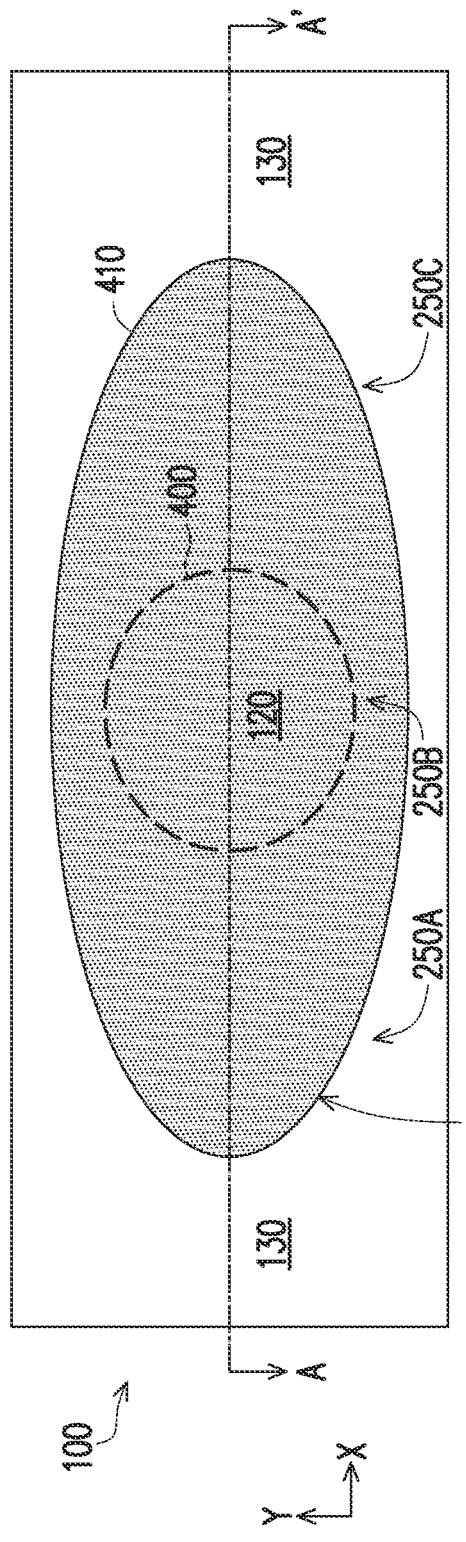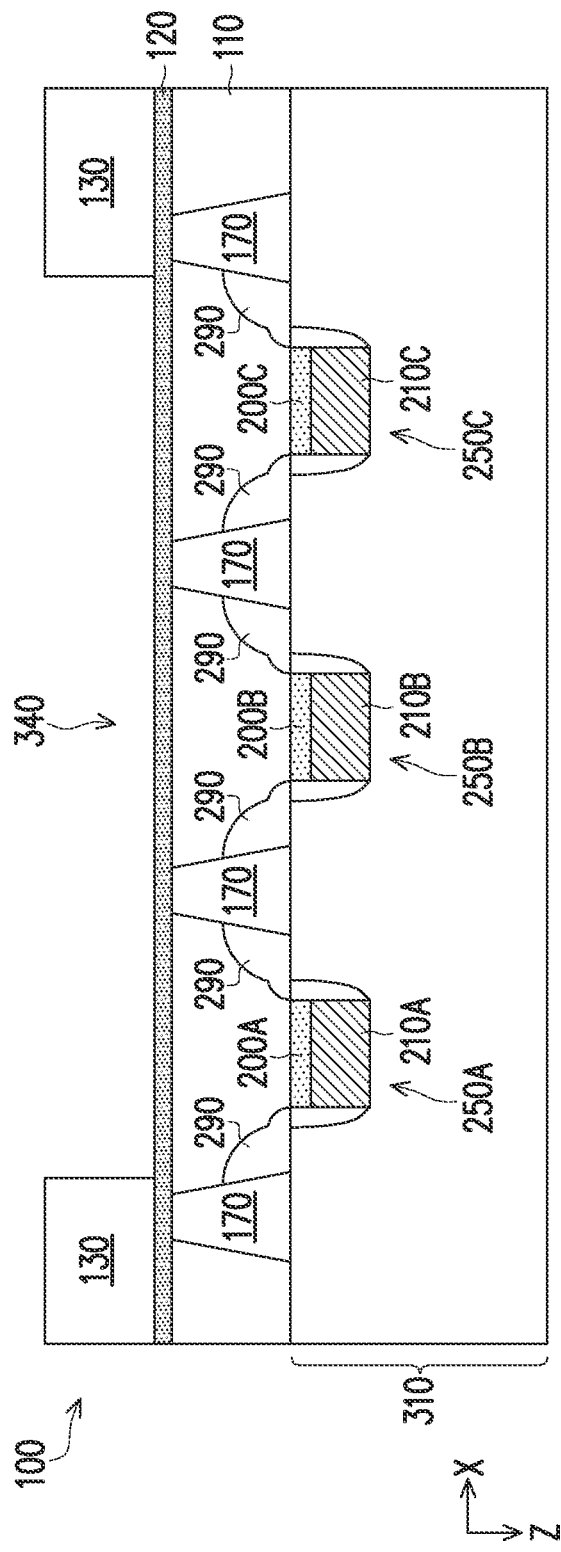

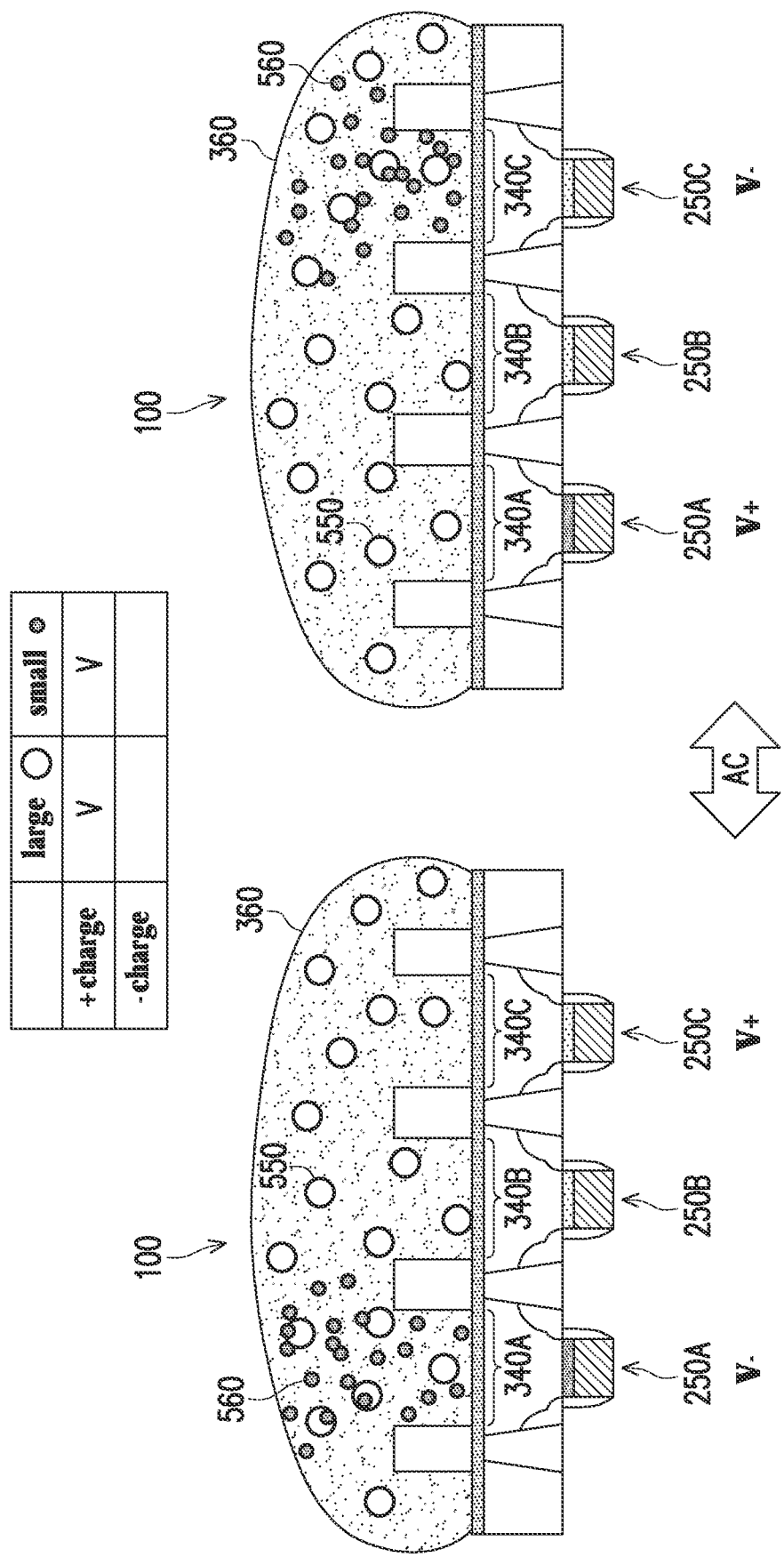

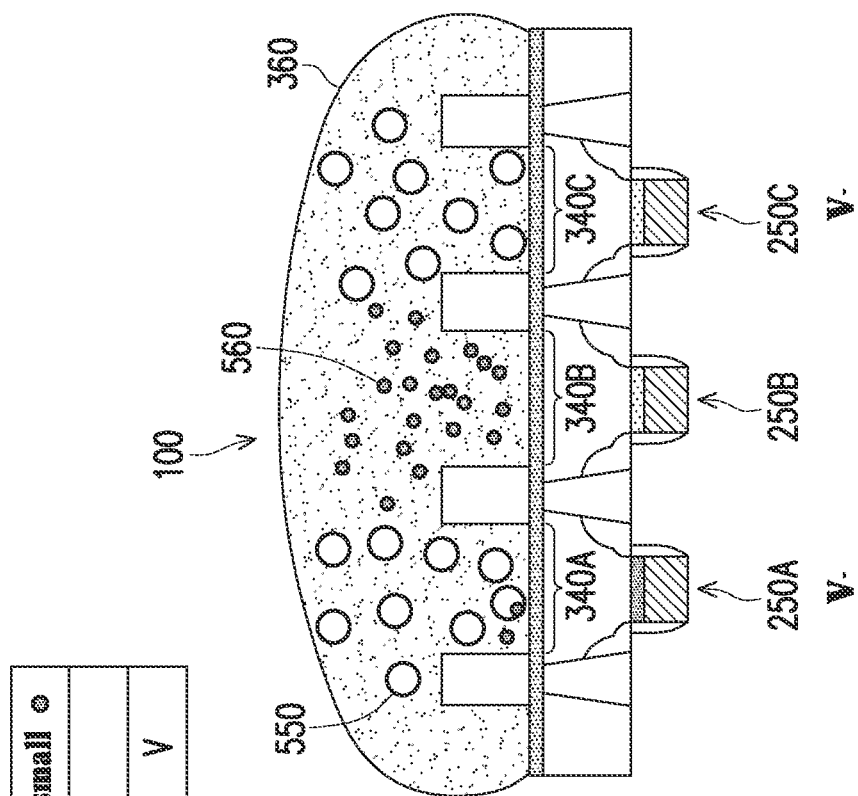
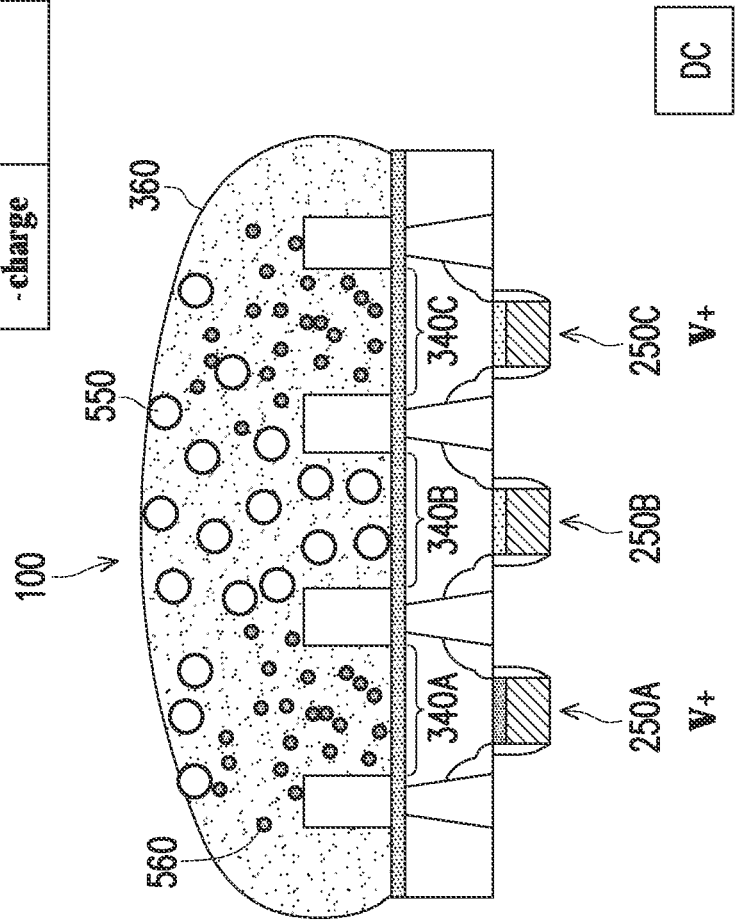
FIG. 21B
FIG. 21A

DEVICE AND METHOD FOR DETECTING MINIATURE TARGETS IN A FLUID SAMPLE

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs.

As semiconductor devices shrink in size but increase in sophistication, they can be deployed in a great variety of applications. These applications may include life-science applications, which may pertain to medical diagnostics or environmental monitoring applications. For example, semiconductor circuitry may be implemented in devices to test the presence of certain types of miniature targets, which may include ions, nucleic acids, polarized molecules, antigens, antibodies, enzymes, cells, proteins, viruses, or bacteria. However, the semiconductor circuitry in the conventional test devices may not be capable of providing a robust reference voltage. As a result, a signal-to-noise ratio of conventional test devices may be sub-optimal. Furthermore, it may be difficult for the conventional test devices to easily distinguish different types of miniature targets. Therefore, although conventional test devise have been generally adequate for their intended purposes, they have not been entirely satisfactory in all respects.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIGS. 12A-12B are a diagrammatic fragmentary cross-sectional side view and a diagrammatic fragmentary planar top view of a semiconductor device at a stage of fabrication according to various aspects of the present disclosure.

FIGS. 14A-14B are a diagrammatic fragmentary cross-sectional side view and a diagrammatic fragmentary planar top view of a semiconductor device at a stage of fabrication according to various aspects of the present disclosure.

FIGS. 15A-15B are a diagrammatic fragmentary cross-sectional side view and a diagrammatic fragmentary planar top view of a semiconductor device at a stage of fabrication according to various aspects of the present disclosure.

FIGS. 16A-16B are a diagrammatic fragmentary cross-sectional side view and a diagrammatic fragmentary planar top view of a semiconductor device at a stage of fabrication according to various aspects of the present disclosure.

FIGS. 19A-19B, 20A-20B, 21A-21B, 22A-22B, 23A-23B, and 24A-24B illustrate cross-sectional side views of a semiconductor device that demonstrate how methods can be performed to selectively sense or detect different types of miniature targets in a fluid sample according to embodiments of the present disclosure.

DETAILED DESCRIPTION

Figure 1:
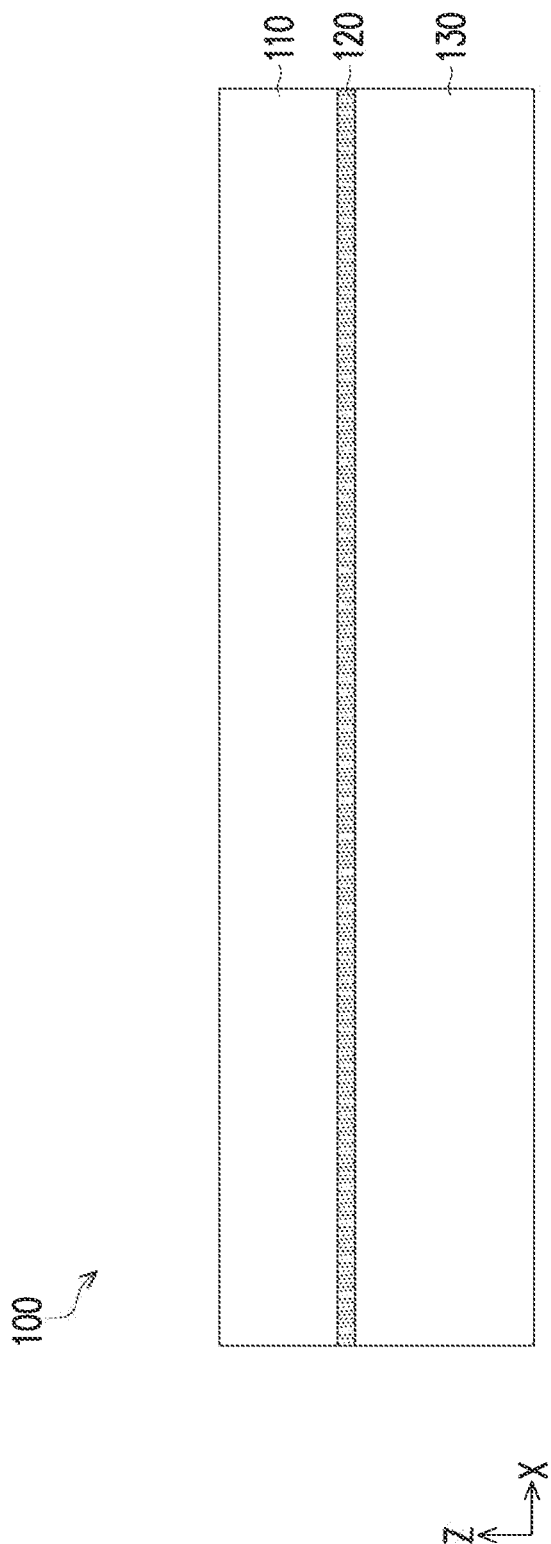
FIGS. 1-11 are diagrammatic fragmentary cross-sectional side views of a semiconductor device at various stages of fabrication according to various aspects of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "over," "below," "beneath," "up," "down," "top," "bottom," etc., as well as derivatives thereof (e.g., "horizontally," "downwardly," "upwardly," etc.) are used for ease of the present disclosure of one features relationship to another feature. The spatially relative terms are intended to cover different orientations of the device including the features. Still further, when a number or a range of numbers is described with "about," "approximate," and the like, the term is intended to encompass numbers that are within a reasonable range including the number described, such as within +/−10% of the number described or other values as understood by person skilled in the art. For example, the term "about 5 nm" encompasses the dimension range from 4.5 nm to 5.5 nm.

The present disclosure is generally related to semiconductor devices, and more particularly to semiconductor devices that are implemented in diagnostic devices to sense or detect the presence of certain types of miniature targets, including but not limited to ions, nucleic acids, polarized molecules, antigens, antibodies, enzymes, cells, proteins, viruses, bacteria, or other biological particles that are smaller than a few hundred microns. For example, a nasal swab may contain semiconductor circuitry configured to detect the presence of the COVID-19 virus. When a user swabs his/her nasal cavity with such a nasal swab device, the swabbed particles or substance may be collected, for example, in the form of nasal fluid. The swabbed nasal fluid may be delivered to semiconductor circuitry for detection of the miniature targets. In some embodiments, the semiconductor circuitry may be embedded in the nasal swab device. In other embodiments, the semiconductor circuitry may be implemented in an analyzer device that is separate from the nasal swab device. Regardless, the particles or substance containing the COVID-19 virus, when forced into a sensing region of the semiconductor circuitry, may cause the semiconductor circuitry to generate certain types of electrical signals (e.g., a predefined level of electrical voltage or current), which may be an indication that the user does indeed have COVID-19. Other types of miniature targets (which may be associated with other illnesses or diseases or certain types of environmental situations) may be detected in a similar manner.

However, the diagnostic devices implemented with conventional semiconductor circuitry may have certain drawbacks. One drawback is the sub-optimal sensitivity. For example, the conventional semiconductor circuitry in these diagnostic devices may not be able to provide a stable reference voltage (also interchangeably referred herein after as a voltage reference). Consequently, the measured signal (corresponding to the presence of miniature targets) may be unstable and prone to interference, which degrades the sensitivity of the diagnostic device. Another drawback is that the conventional circuitry may not be designed in a manner to facilitate the individual detection of different types of miniature targets. For example, if a fluid sample contains multiple different types of miniature targets, the conventional circuitry (and the method of miniature target detection utilizing the conventional circuitry) are not configured to individually detect the presence of one type of miniature targets without the signal interference from the other types of miniature targets in the fluid sample. This means that the conventional diagnostic devices may have suboptimal versatility.

The present disclosure provides a novel semiconductor device (and a unique fabrication flow thereof) in which multiple voltage reference transistors are implemented for each sensing transistor, which provides greater voltage reference stability and thus improves the sensitivity of the diagnostic device on which the semiconductor device is implemented. The voltage reference transistors may also be configured to have different material compositions and/or different dimensions, which facilitates the individual detection of different types of miniature targets, as will be discussed below in more detail.

FIGS. 1-11 illustrate a series of cross-sectional side views of a semiconductor device 100 at various stages of fabrication according to embodiments of the present disclosure. FIGS. 1-11 correspond to a cross-section taken along a plane defined by a X-direction as its horizontal direction and a Z-direction as its vertical direction. FIGS. 1-11 may also be referred to as X-cut views.

The fabrication of the semiconductor device 100 begins by providing a silicon-on-insulator wafer, which includes a substrate 110, a substrate 130, and an intra-isolation layer 120 disposed between the substrate 110 and the substrate 130. The substrate 110 or the substrate 130 may comprise an elementary (e.g., single element) semiconductor, such as silicon, germanium, and/or other suitable semiconductor materials. The intra-isolation layer 120 may include hafnium oxide, tantalum oxide, zirconium oxide, some other suitable high-k dielectric(s), or any combination of the foregoing. In some embodiments, intra-isolation layer may include multiple layers, where at least some of the layers may have different material compositions than the rest of the layers of the intra-isolation layer 120. As will be discussed in more detail below, the intra-isolation layer 120 may be used as a sensing film in a later stage for sensing miniature targets.

Figure 2:
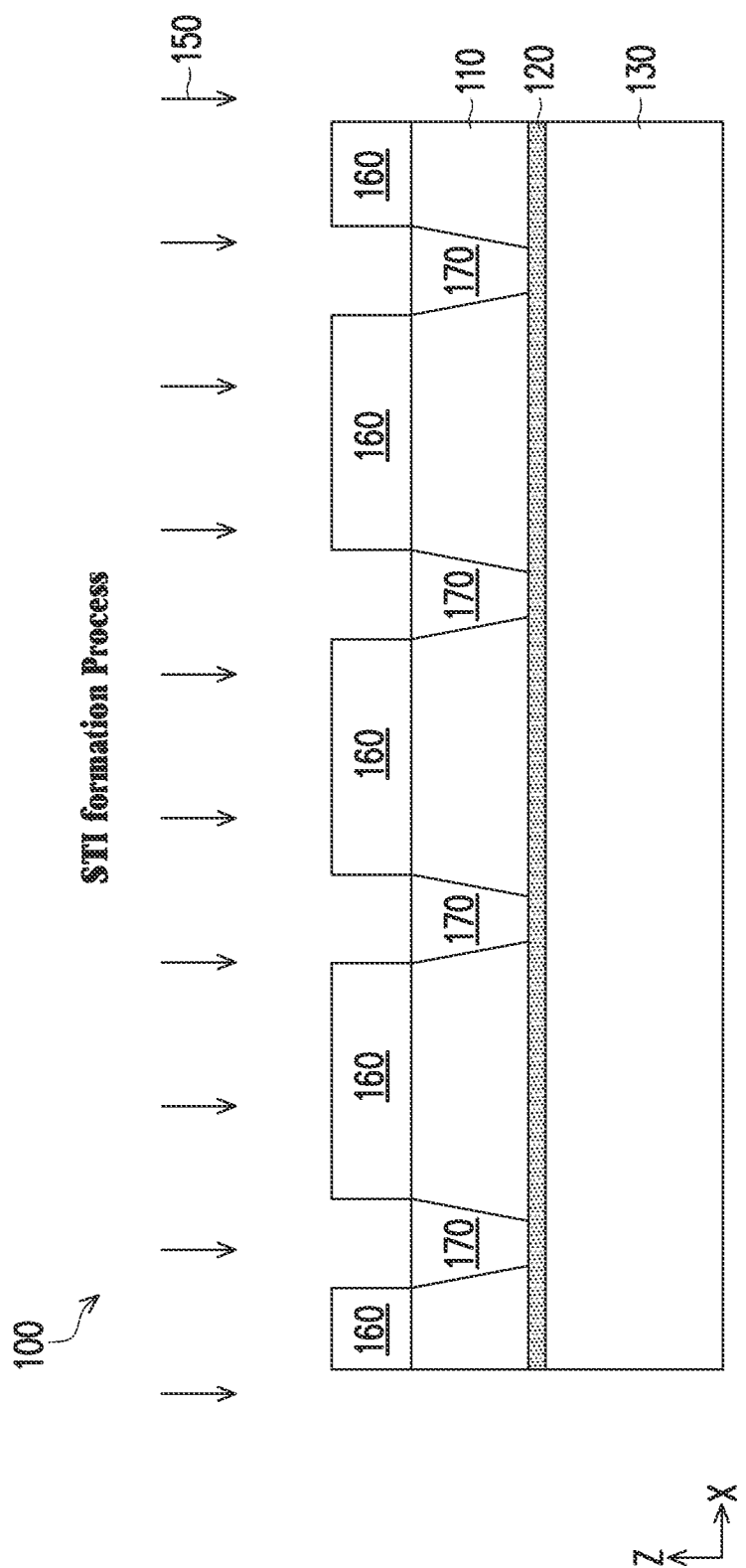

Referring now to FIG. 2, an STI formation process 150 is performed to the semiconductor device 100. For example, a patterning process may be performed to form a patterned photoresist layer 160. The patterned photoresist layer 160 is formed by a plurality of lithography processes such as spin coating, exposing, baking, developing (though not necessarily in that order). The resulting patterned photoresist layer 160 defines a plurality of openings through which the substrate 110 is etched, while the patterned photoresist layer 160 serves as a protective mask. Thus, trenches may be etched into the substrate 110, and these trenches are then filled by a dielectric material to form the shallow isolation trenches (STIs) 170. In some embodiments, the STIs 170 may include silicon oxide, silicon nitride, silicon oxynitride, etc. The STIs 170 may extend vertically through the substrate 110 but stops at the intra-isolation layer 120.

Figure 3:
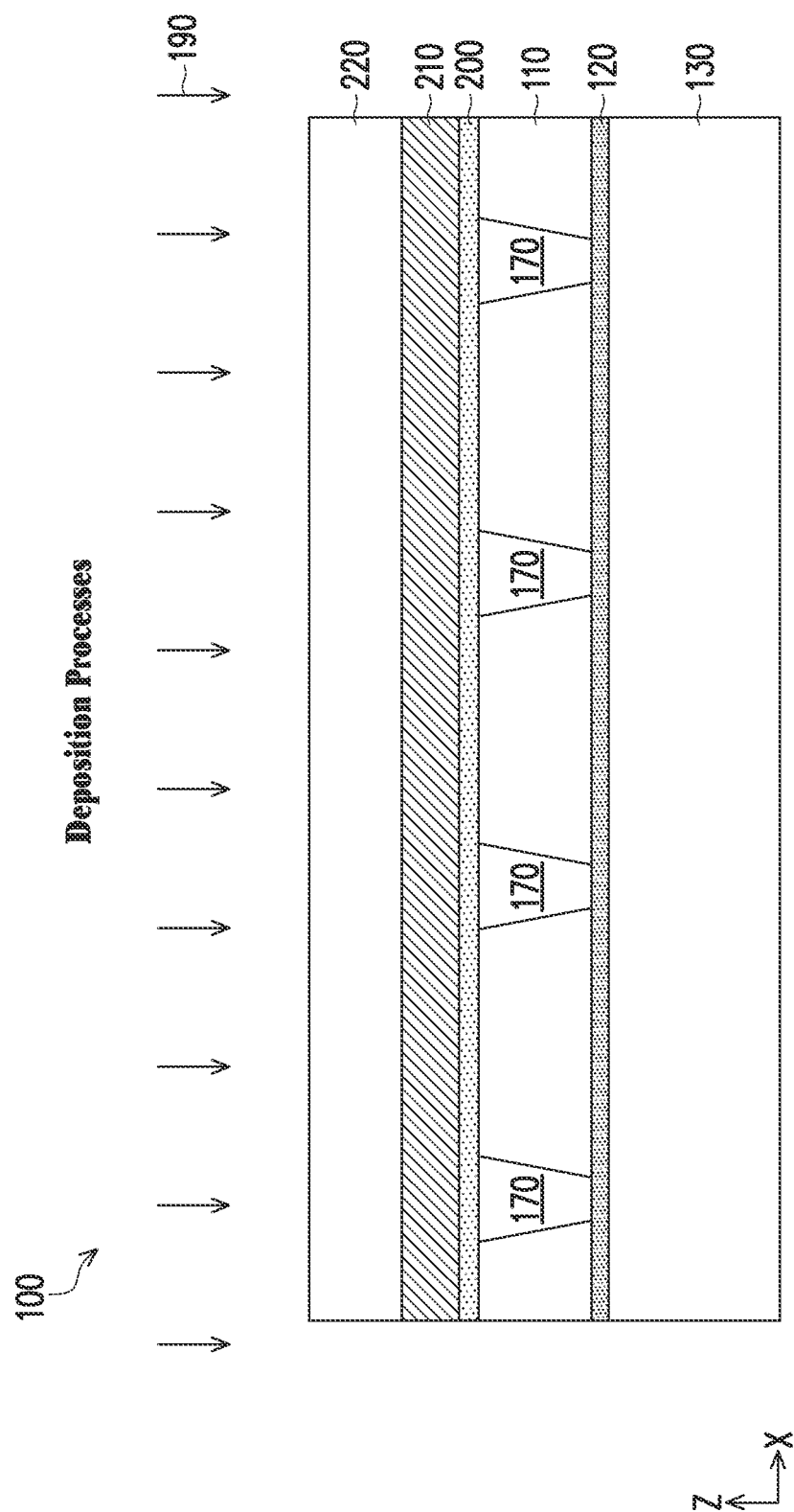

Referring now to FIG. 3, the patterned photoresist layer 160 is removed, for example, using a photoresist ashing or photoresist stripping process. Thereafter, a plurality of deposition processes 190 are performed to form a gate dielectric layer 200 over the substrate 110 and a gate electrode layer 210 over the gate dielectric layer 200. In various embodiments, the deposition processes 190 may include chemical vapor deposition (CVD), physical vapor deposition (PVD), or atomic layer deposition (ALD), or combinations thereof. The gate dielectric layer 200 and the gate electrode layer 210 will be patterned into the gate dielectric and gate electrode components of individual gates later. A photoresist layer 220 is formed over the gate electrode layer 210 thereafter. The photoresist layer 220 may be formed via a spin coating process.

Figure 4:
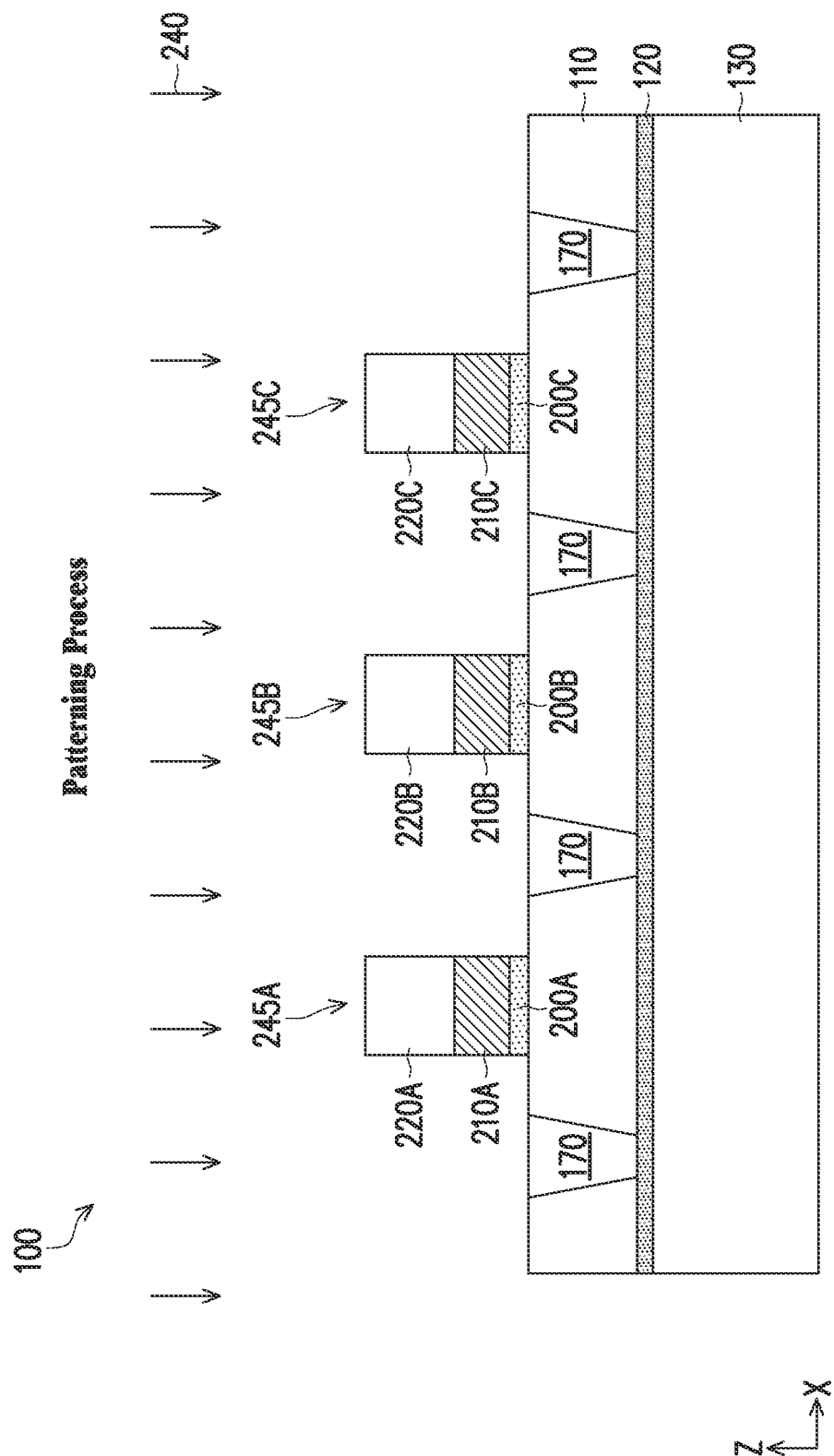

Referring now to FIG. 4, a patterning process 240 is performed to the semiconductor device 100 to form individual gates 245A, 245B, and 245C. For example, the photoresist layer 220 may first be patterned into patterned photoresist masks 220A, 220B, and 220C via lithography processes such as spin coating, exposing, baking, developing, etc. The gate electrode layer 210 and the gate dielectric layer 200 are then etched while the patterned photoresist masks 220A-220C protect their respective portions of the gate electrode layer 210 and gate dielectric layer 200 therebelow. As a result, the individual gates 245A, 245B, and 245C are formed over the substrate 110.

Figure 5:
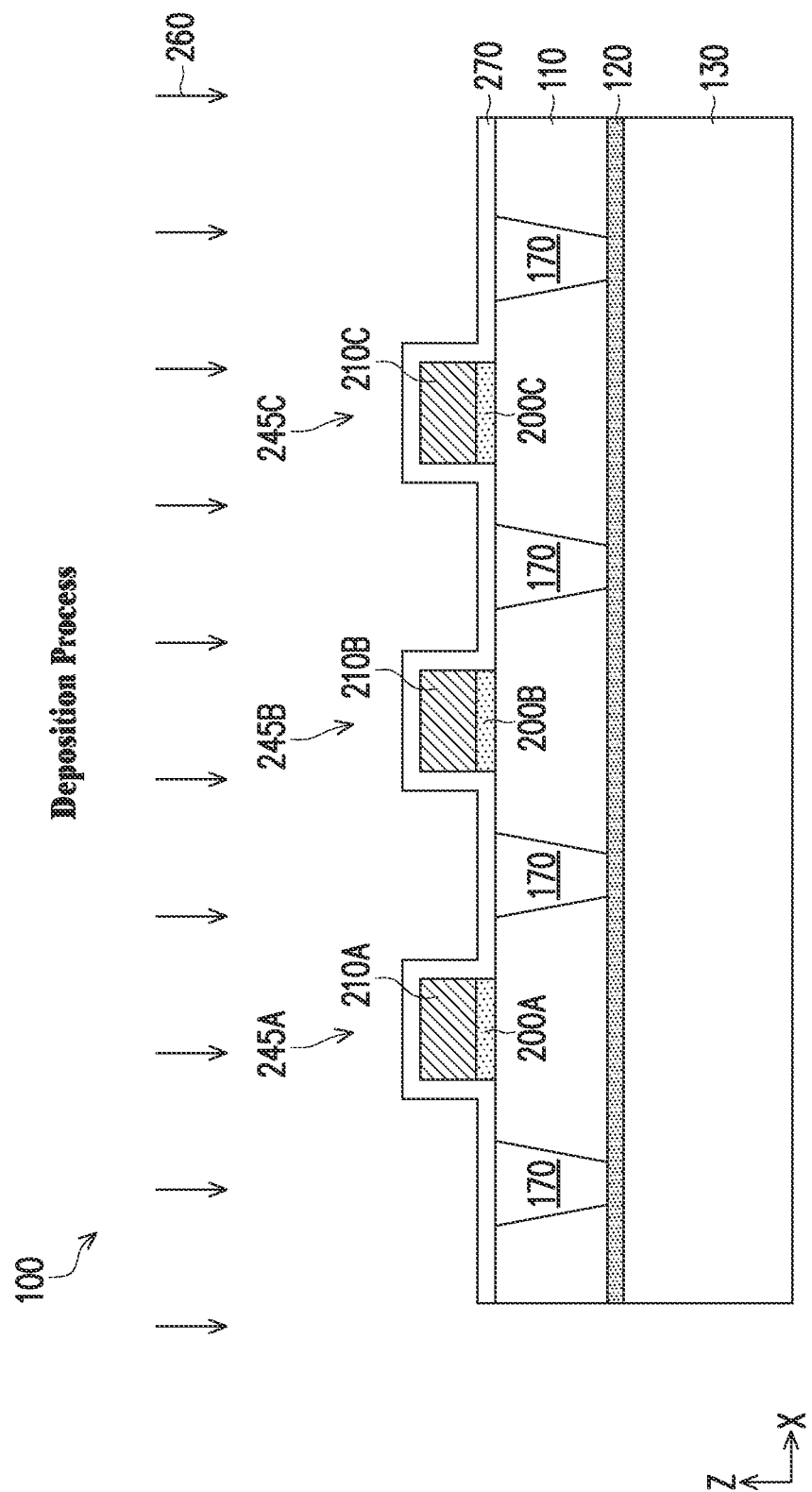

Referring now to FIG. 5, the patterned photoresist masks 220A-220C are removed, for example, using a photoresist ashing or photoresist stripping process. Thereafter, a deposition process 260 is performed to form a spacer layer 270 over the substrate 110 and over the gates 245A-245C. In some embodiments, the deposition process 260 includes CVD, PVD, ALD, or combinations thereof. In some embodiments, the spacer layer 270 may include a dielectric material, for example, silicon oxide, silicon nitride, silicon carbide, silicon oxynitride, etc.

Figure 6:
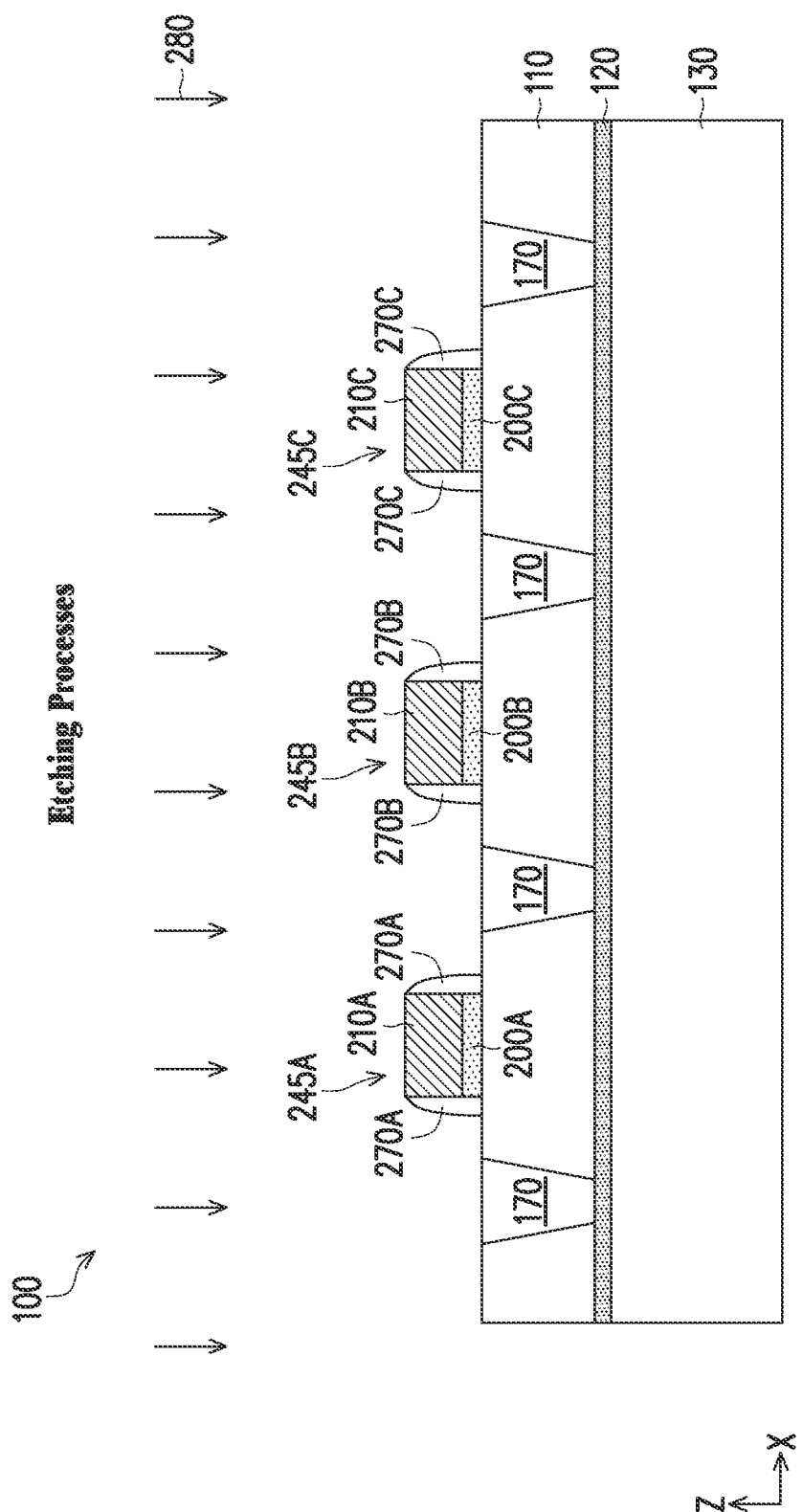

Referring now to FIG. 6, one or more etching processes 280 are performed to the semiconductor device 100 to pattern the spacer layer 270 into gate spacers 270A, 270B, and 270C for the gates 245A, 245B, and 245C, respectively. In some embodiments, the etching processes 280 include dry etching processes. As a result of the etching processes, the gate spacers 270A-270C are formed on the sidewalls of the gate dielectric layers 200A-200C and the gate electrode layers 210A-210C. The gate spacers 270A-270C may also be considered parts of the gates 245A-245C.

Figure 7:
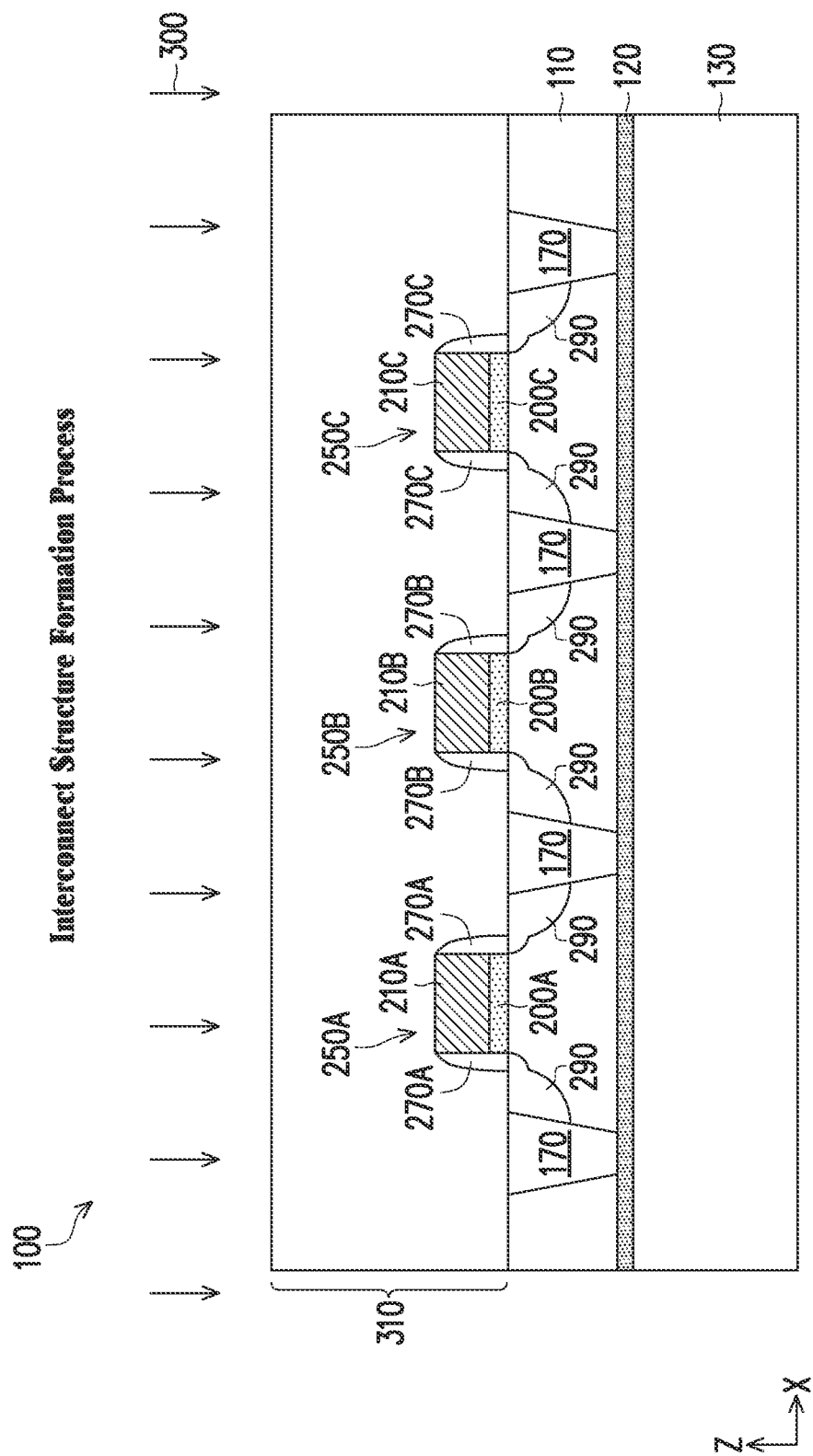

Referring now to FIG. 7, source/drain regions 290 are formed in the substrate 110 and on opposite sides of each of the gates 245A-245C. The source/drain region 290 are formed using one or more ion implantation processes or doping processes. The source/drain regions 290, in combination with the gates 245A-245C, form different transistors 250A-250C, respectively, of the semiconductor device 100, including sensing transistors and voltage reference transistors, as will be discussed in more detail below.

Still referring to FIG. 7, an interconnect structure formation process 300 is performed to the semiconductor device 100 to form an interconnect structure 310 over the substrate 110 and over the gates 245A-245C. The interconnect structure 310 includes a plurality of interconnect layers, which is also interchangeably referred to herein as metal layers, such as a Metal-0 (M-0) layer, a Metal-1 (M-1) layer, . . . , a Metal-N (M-N) layer. The metal layers each include a plurality of conductive interconnecting elements such as metal lines and conductive vias or contacts. The metal lines in each metal layer extend horizontally, and the metal lines from different metal layers are vertically interconnected together by the conductive vias or contacts. Conductive materials such as copper, cobalt, aluminum, tungsten, ruthenium, or combinations thereof, may be used to implement the metal lines and/or the vias/contacts. Electrical access to the various components (e.g., the gates 245A-245C) of the semiconductor devices 100 is made possible through the metal lines and the vias. For reasons of simplicity, the details of the metal lines and the conductive vias/contacts are not illustrated herein.

Figure 8:
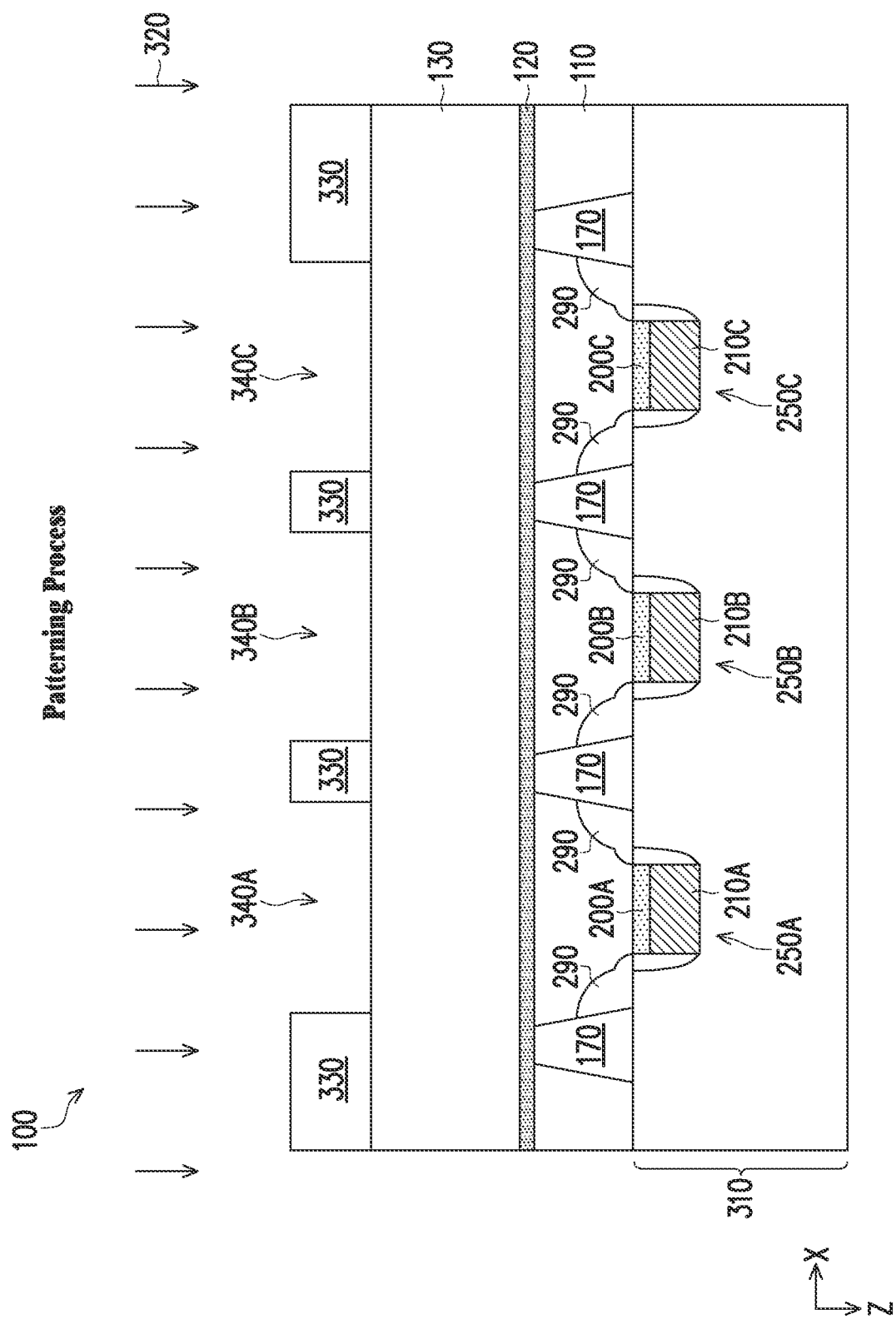

Referring now to FIG. 8, the semiconductor device 100 is flipped over vertically in the Z-direction. In other words, whereas the interconnect structure 310 is illustrated as being located "above" the substrate 110 in FIG. 7, the interconnect structure 310 is illustrated as being located "below" the substrate 110 in FIG. 8. A first part of a patterning process 320 is then performed to the semiconductor device 100, where a patterned photoresist layer 330 is formed over the substrate 130. The patterned photoresist layer 330 is formed by a plurality of lithography processes such as spin coating, exposing, baking, developing, etc. The resulting patterned photoresist layer 330 defines a plurality of openings 340A, 340B, and 340C. The openings 340A-340C expose portions of the substrate 130 and are vertically aligned with the gates 245A-245C, respectively.

Figure 9:
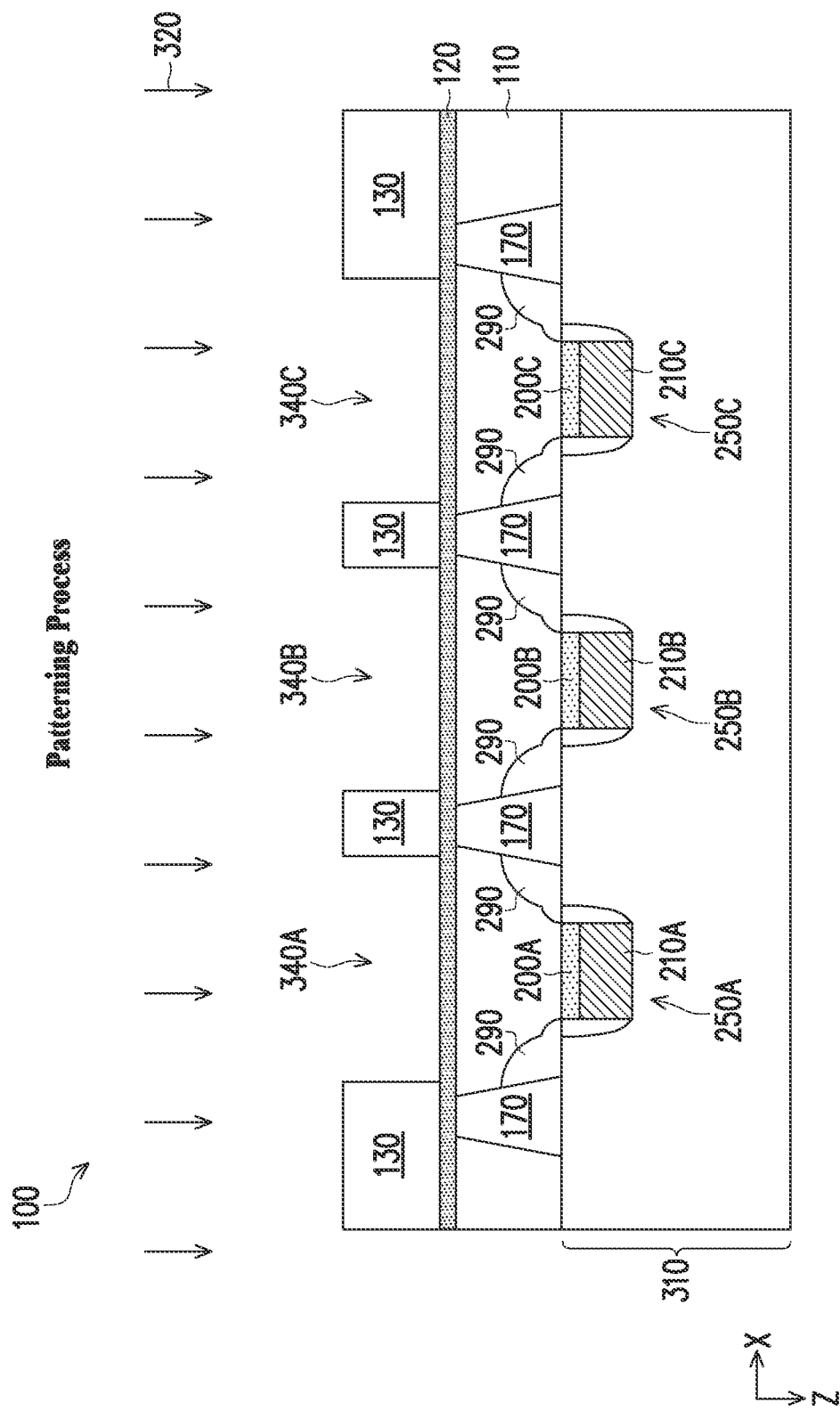

Referring now to FIG. 9, a second part of the patterning process 320 is performed to the semiconductor device 100 to extend the openings 340A-340C into the substrate 130. For example, one or more etching processes may be performed (as a part of the patterning process 320) to the substrate 130 while the patterned photoresist layer 330 serves as a protective etching mask. The exposed portions of the substrate 130 are etched away, such that the intra-isolation layer 120 is exposed. The openings 340A-340C are configured to collect fluid samples (e.g., nasal fluid of a patient) for diagnostic purposes when the semiconductor device 100 is put to actual use. The patterned photoresist layer 330 may be removed after the openings 340A-340C are etched into the substrate 130. Note that the remaining portions of the substrate 130 may be interchangeably referred hereinafter to as a patterned structure 130 that defines the openings 340A-340C.

Figure 10:
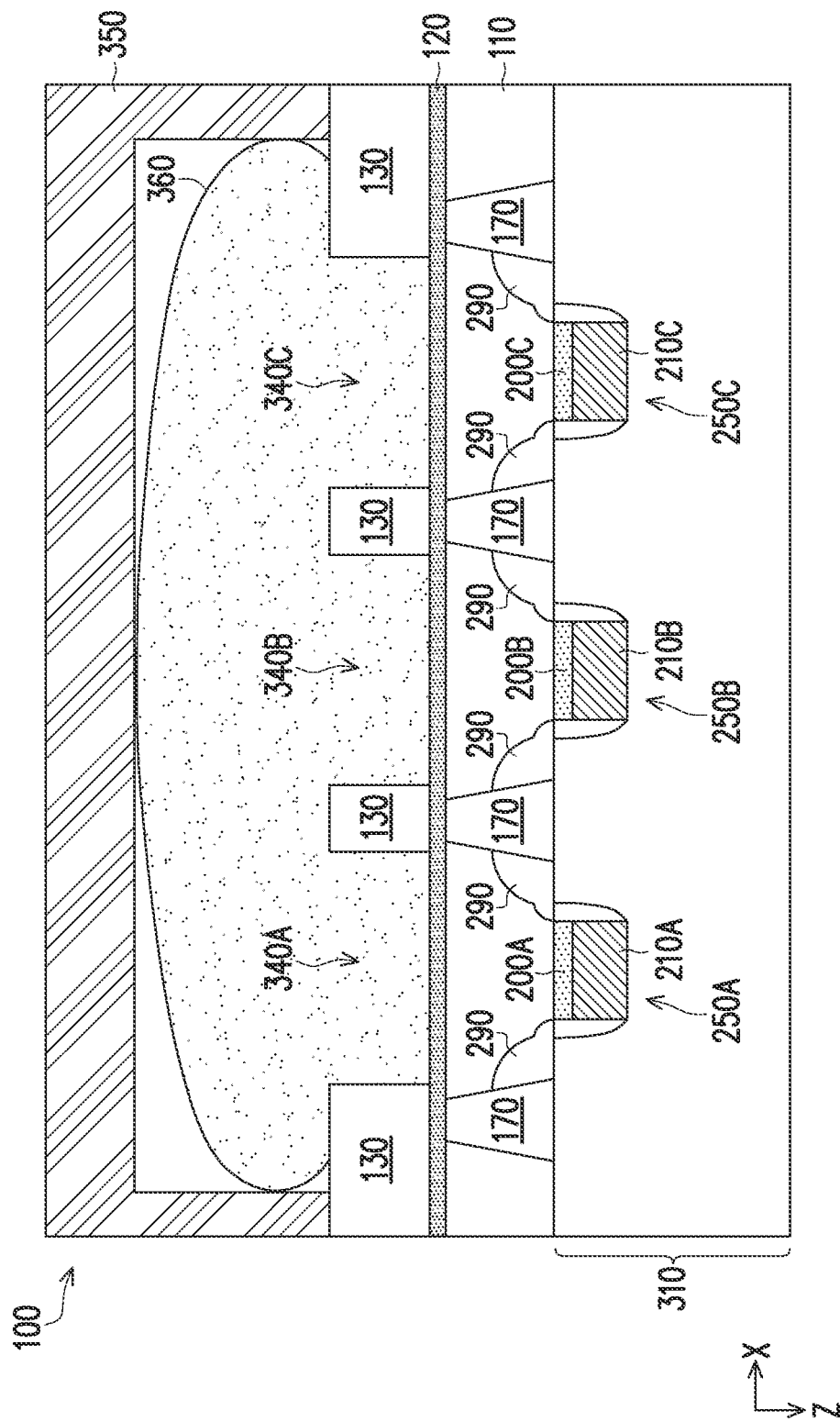

Referring now to FIG. 10, a micro-fluid channel 350 is formed over the patterned structure 130. The micro-fluid channel 350 may serve as a soft cap or cover over the semiconductor device 100, and it facilitates the flow of a fluid sample 360, which as discussed above, may contain miniature targets to be detected by the semiconductor device 100. As shown in FIG. 10, the fluid sample 360 may be collected in all three of the openings 340A-340C. However, miniature targets of the fluid sample 360 collected the opening 340B are sensed by the semiconductor device 100. In more detail, the intra-isolation layer serves as a sensing film 120 (interchangeably referred to as such below) and is configured to attach to predefined miniature targets in the fluid sample 360.

For example, the semiconductor device 100 may be a part of nasal swab test for testing whether a patient is infected with the COVID-19 virus. As the user swabs his/her nasal cavity with a nasal swab device, the fluid sample 360 of the nasal fluid of the patient may be collected by the openings 340A-340C, including the opening 340B. The fluid sample 360 may contain miniature targets, which may be the COVID-19 virus in this simplified example. The miniature targets may have electrical charges, especially when designated antibodies are merged in the fluid sample 360. The material composition of the sensing film 120 is configured such that it is sensitive to a pH of the fluid sample 360, and hence it may react to, or bind with, the miniature targets in the fluid sample 360. When this occurs, the surface potential difference at the sensing film 120 changes. The change in the surface potential difference changes a threshold voltage of the transistor 250B (which serves as a sensing transistor herein) through a capacitive coupling mechanism, which may be used to characterize and/or identify the miniature targets. For example, the transistors 250A and 250B may each be biased as a voltage reference device while the transistor 250B serves as a sensing device, so as to induce a formation of a channel. The drain current of the transistor 250B may be sensitive to this and may change accordingly. The miniature targets may be characterized and/or identified by an impedance of the channel and/or by the change in the drain current.

One of the unique features of the present disclosure is that it implements multiple voltage reference transistors in multiple direction around each miniature target sensing transistor. For example, as will be discussed in greater detail below with reference to FIGS. 17-18, the semiconductor device 100 may include a plurality of sets of transistors, where each set of transistors includes a sensing transistor such as the transistor 250B, as well as multiple voltage reference transistors such as the transistors 250A-250B. The voltage reference transistors are disposed around the sensing transistor laterally in multiple directions, or circumferentially surround the sensing transistor altogether. As a result, a more stable and reliable voltage reference can be supplied. Had only one voltage reference transistor been implemented for every sensing transistor, where the voltage reference transistor is just located to one side of the sensing transistor, the resulting device may be more prone to signal interference from adjacent sets of transistors, which could degrade the sensitivity and/or accuracy of the device. Here, the fact that there are multiple voltage references in different directions for each sensing transistor means that the semiconductor device 100 is more sensitive to the electrical signals generated by the miniature targets collected in the opening 340B, and less prone to signal interference from nearby transistors, which means improved sensitivity and a better signal-to-noise ratio. It is understood that such a unique physical trait of the present application is an inherent result of the fabrication process flow discussed above with reference to FIGS. 1-10 (e.g., forming multiple voltage reference transistors 250A and 250C around each sensing transistor 250B in different directions, as well as etching the opening 340A-340C to be vertically aligned with these transistors, respectively).

Figure 11:
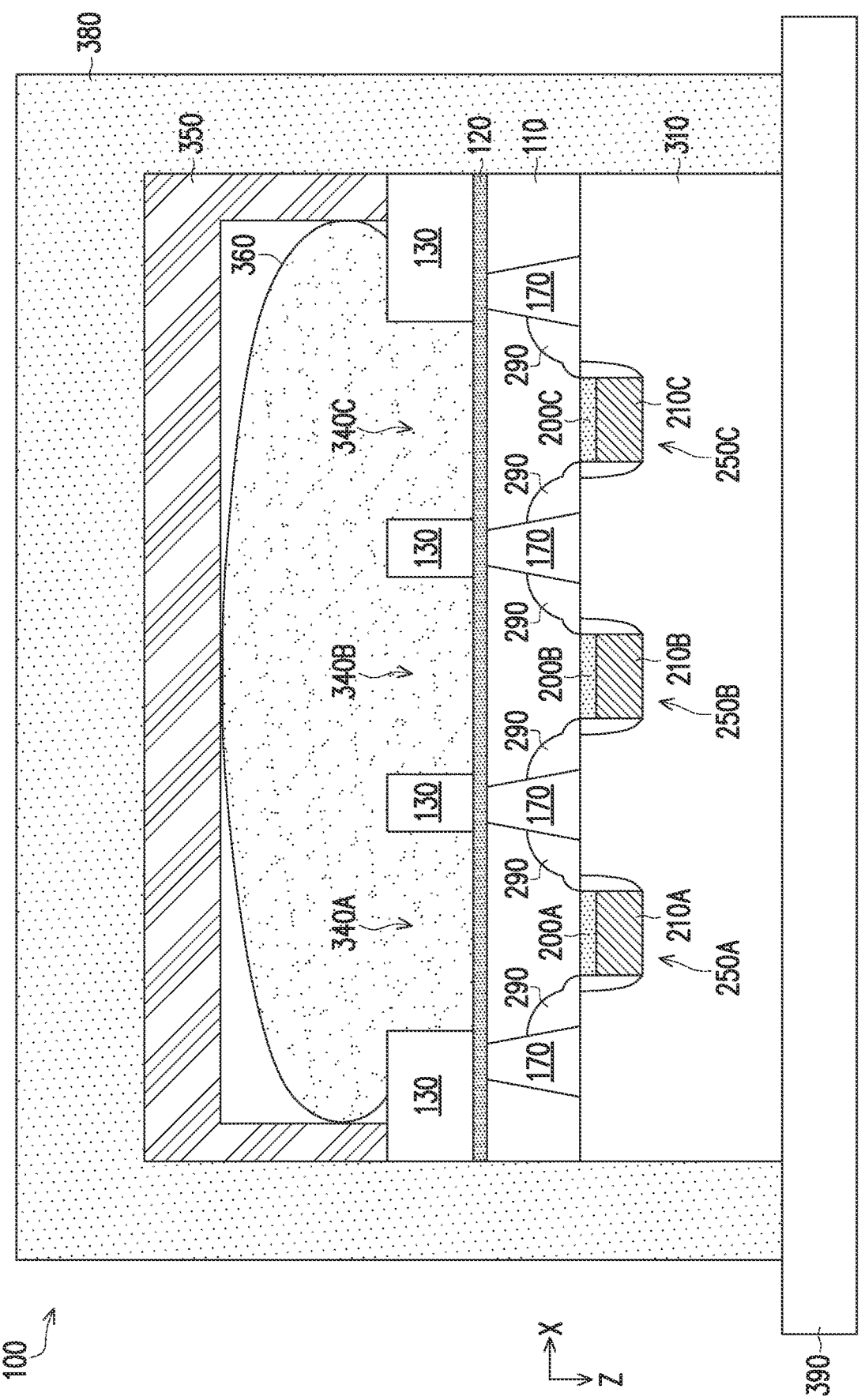

Referring now to FIG. 11, to complete the fabrication of the semiconductor device 100, another encapsulation structure 380 is placed around the micro-fluid channel 350, the substrate 130 and 110, as well as the interconnect structure 310. The encapsulation structure 380 may be made of a hardened material and may be configured to restrict the movement of the rest of the semiconductor device 100 encapsulated therein. For example, the encapsulation structure 380 may prevent the shifting or other movements of the micro-fluid channel 350, especially since the micro-fluid channel may be soft and may be prone to shifting or movement. The encapsulation structure 380 and the rest of the semiconductor device 100 encapsulated therein may constitute an integrated circuit (IC) chip. The IC chip is bonded to another substrate, for example, to a printed circuit board (PCB) substrate 390.

FIGS. 12A and 12B illustrate a cross-sectional view and a planar top view of the semiconductor device 100, respectively, according to an embodiment of the present disclosure. For reasons of simplicity, the cross-sectional view of FIG. 12A corresponds to the semiconductor device 100 in the fabrication stage of FIG. 9, that is, before the micro-fluid channel 350, the encapsulation structure 380, and the substrate 390 are implemented around the semiconductor device 100. The cross-sectional view of FIG. 12A is taken along a cutline A-A' in the top view of FIG. 12B.

As shown in FIG. 12B, the patterned structure 130 (i.e., the remaining portions of the substrate 130) define the openings 340A-340C, which are vertically aligned with the transistors 250A-250C, respectively. The openings 340A-340C expose portions of the sensing film 120, which as discussed above with reference to FIG. 10, may be configured to bond to the miniature targets in the fluid sample 360.

Figure 13:
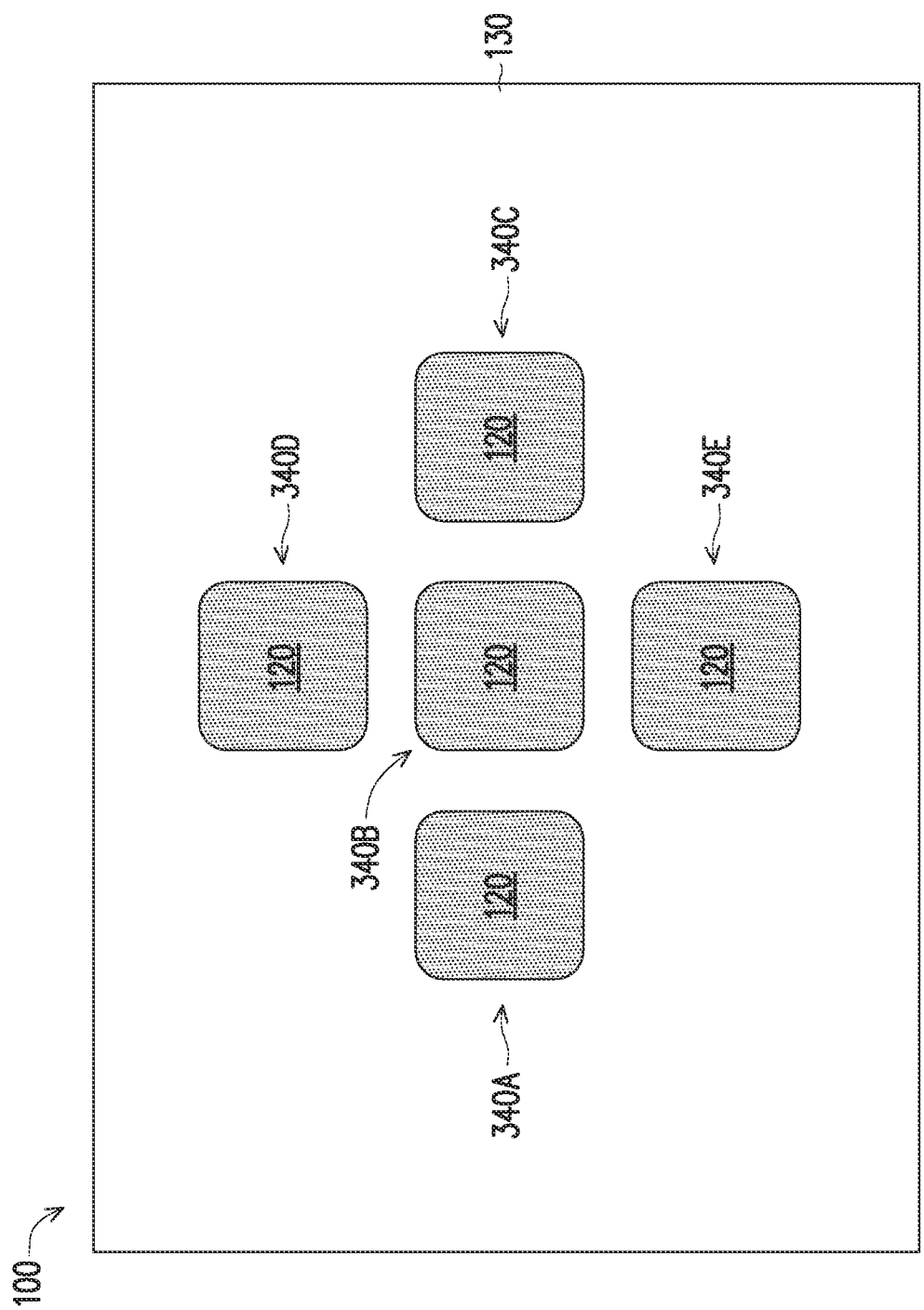
FIG. 13 is a diagrammatic fragmentary planar top view of a semiconductor device at a stage of fabrication according to various aspects of the present disclosure.

Although FIGS. 12A-12B illustrate the disposition of multiple voltage reference transistors on opposite sides of a single sensing transistor along the X-direction, such an implementation is not intended to be limiting. It is understood that the multiple voltage reference transistors may be implemented around the sensing transistor in more than two directions. For example, referring now to FIG. 13, a planar top view of the semiconductor device 100 is illustrated according to an alternative embodiment. In this embodiment, there are four voltage reference transistors for a single sensing transistor. The patterned structure 130 defines openings 340A, 340B, 340C, 340D, and 340E. The locations of the four voltage reference transistors correspond to the openings 340A, 340C, 340D, and 340E, and the location of the sensing transistor corresponds to the opening 340B. The openings 340A and 340C are located on opposite sides of the opening 340B in the X-direction, and the openings 340D- 340E are located on opposite sides of the opening 340B in the Y-direction. As such, two voltage reference transistors are located on opposite sides of the sensing transistor in the X-direction, while two other voltage reference transistors are located on opposite sides of the sensing transistor in the Y-direction. Having four voltage reference transistors disposed around the single sensing transistor may provide an even more stable voltage reference, which further improves the miniature target detection sensitivity of the semiconductor device 100.

FIGS. 14A-14B illustrate the cross-sectional side view and the planar top view, respectively, of another alternative embodiment of the semiconductor device 100. The cross-sectional view of FIG. 14A is taken along a cutline A-A' in the top view of FIG. 14B. For reasons of consistency and clarity, similar components in FIGS. 14A-14B will be labeled the same as they were in FIGS. 1-11, 12A-12B, and 13. One difference of the embodiment of FIGS. 14A-14B is that the patterned structure 130 defines one opening 340 that covers all the sensing and voltage reference transistors, rather than defining openings that individually cover each of the transistors. In other words, the opening 340 is wide enough in both the X-direction and the Y-direction to expose a portion of the sensing film 120 that encompasses the locations of the sensing transistor 250B and the voltage reference transistors 250A and 250C.

As shown in FIG. 14B, the voltage reference transistors 250A and 250C may be considered as one large transistor that circumferentially surrounds the sensing transistor 250B in 360 degrees in the top view. A boundary 400 between the sensing transistor 250B and the voltage reference transistors 250A/250C is illustrated via broken lines in the top view of FIG. 14B, even though such a boundary 400 is not directly visible (since it is blocked by the sensing film 120. The boundary 400 may be defined by the STIs 170 around the sensing transistor 250B. The regions encircled by the boundary 400 may correspond to the source/drains 290 and the channel region of the sensing transistor 250B, whereas the regions outside the boundary 400 may correspond to the source/drains 290 and the channel regions of the voltage reference transistors 250A/250C. Again, having such a voltage reference transistor (i.e., comprised of the transistors 250A/250C) that surrounds the sensing transistor 250B in all sides allows a highly stable voltage reference to be provided, and therefore it improves the sensitivity of the semiconductor device 100.

The top view of FIG. 14B also illustrates a boundary 410 of the opening 340, which is defined by the patterned structure 130. The boundary 410 (which is visible in the top view of FIG. 14B) completely surrounds the boundary 400 (which is not directly visible in FIG. 14B). It is understood that the top view shape or profile of the boundary 400 and the boundary 410 may be flexibly configured. In the embodiment shown in FIG. 14B, the top view shape/profile of the boundary 400 may be substantially rectangular, albeit with somewhat rounded corners. Again, such a substantially rectangular top view shape/profile refers to the source/drain region 290 and the channel region of the sensing transistor 250B defined by the STIs 170 around the sensing transistor 250B. Similarly, the top view shape/profile of the boundary 410 may also be substantially rectangular, possibly with rounded corners. As discussed above, such a boundary 410 refers to the boundary of the opening 340, which is defined by the patterned structure 130. In some embodiments, the rectangular top view shape/profile of the boundary 400 or the boundary 410 may also resemble a square, which is a special case of a rectangle.

FIGS. 15A-15B illustrate the cross-sectional side view and the planar top view, respectively, of yet another alternative embodiment of the semiconductor device 100. The cross-sectional view of FIG. 15A is taken along a cutline A-A' in the top view of FIG. 15B. For reasons of consistency and clarity, similar components in FIGS. 15A-will be labeled the same as they were in FIGS. 14A-14B. One difference is that the top view shape/profile of the boundary 400 is no longer rectangular but more rounded instead. In some embodiments, the top view shape/profile of the boundary 400 may be an oval or an eclipse. In other embodiments, the top view shape/profile of the boundary 400 may be a circle. Again, such a top view shape/profile may be defined by the STIs 170 around the sensing transistor 250B. Note that the top view shape/profile of the boundary 410 may still remain substantially rectangular in this embodiment.

FIGS. 16A-16B illustrate the cross-sectional side view and the planar top view, respectively, of yet another alternative embodiment of the semiconductor device 100. The cross-sectional view of FIG. 16A is taken along a cutline A-A' in the top view of FIG. 16B. For reasons of consistency and clarity, similar components in FIGS. 16A-16B will be labeled the same as they were in FIGS. 14A-14B and 15A-15B. One difference is that the top view shape/profile of both the boundary 400 and the boundary 410 are no longer rectangular but more rounded instead as well. In some embodiments, the top view shape/profile of the boundary 400 and the boundary 410 may each be an oval or an eclipse. In other embodiments, the top view shape/profile of the boundary 400 and the boundary 410 may each be a circle. Again, the top view shape/profile of the boundary 400 may be defined by the STIs 170 around the sensing transistor 250B, while the top view shape/boundary 410 may be defined by the patterned structure 130.

One advantage conferred by the rounded top view shape/profile of the boundary 410 is that it reduces the likelihood of trapped bubbles in the opening 340. This is because the rounded top/view profile of the boundary 410 means that the sidewall of the opening 340 is also rounded or curved. In other words, the sidewall of the opening 340 lacks angular corners, which could have been prone to trap air bubbles. Here, the fluid sample 360 (see FIG. 11) may flow more freely within the opening 340 without air bubbles being potentially trapped by one or more corners of the opening 340, since such angular corners do not exist. The bubble-free collection of the fluid sample 360 by the opening 340 facilitates the attachment of the miniature targets of the fluid sample 360 with the sensing film 120, which further improves the sensitivity of the semiconductor device 100.

It is understood that other shapes/profiles may be implemented for the boundary 400 or the boundary 410 in other embodiments. For example, in some embodiments, the boundary 400 may assume a substantially rectangular top view shape/profile, while the boundary 410 may assume a substantially rounded (e.g., oval or circular) top view profile. In other embodiments, the boundary 400 or the boundary 410 may assume non-rectangular and non-oval top view shapes/profiles, for example, a triangular top view shape/profile or a polygonal top view shape/profile.

Figure 17:
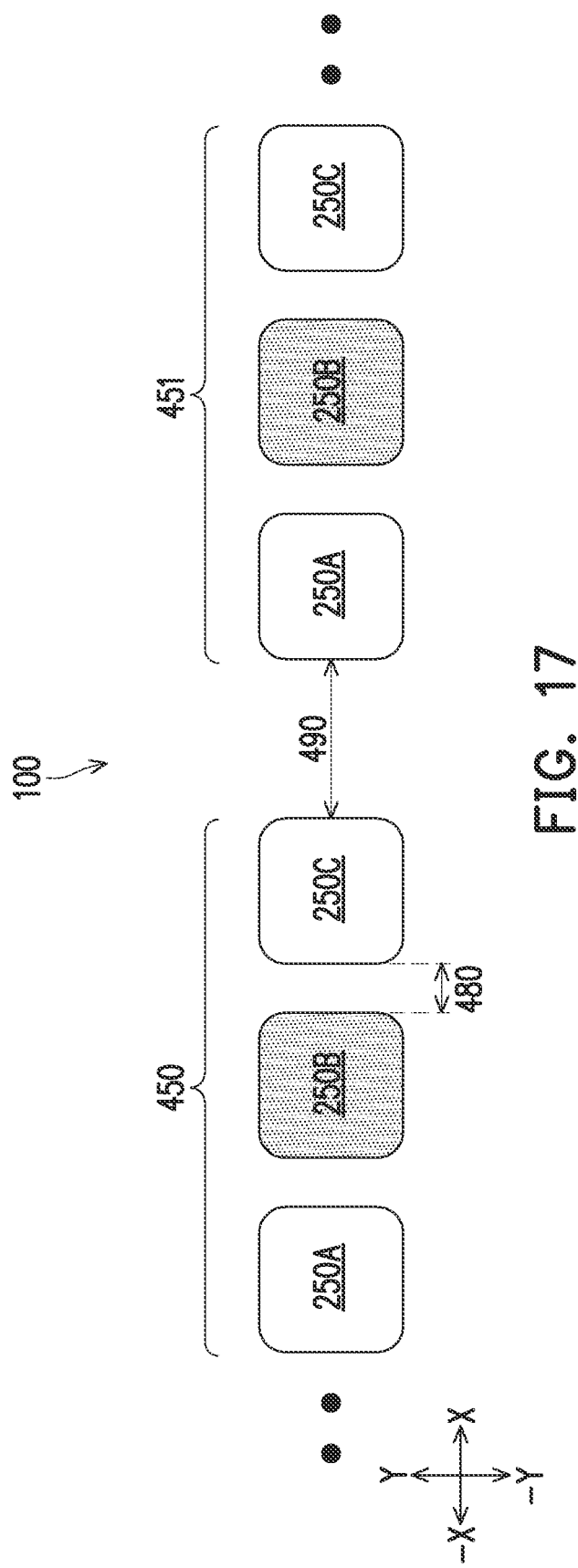
FIG. 17 illustrates a simplified planar top view of a semiconductor device 100 according to an embodiment of the present disclosure.

FIG. 17 illustrates a simplified planar top view of the semiconductor device 100 according to an embodiment of the present disclosure. For reasons of simplicity, FIG. 17 merely illustrates the transistors 250A-250C discussed above as separate blocks, where each of the blocks roughly corresponds to the location and size of the respectively represented transistor. As shown in FIG. 17, the semiconductor device 100 may include a plurality of sets of the voltage reference transistors 250A and 250C and the sensing transistor 250B. For reasons of simplicity, two example sets 450 and 451 are illustrated herein, where the sets 450 and 451 are aligned with each other and extend in the X-direction. Each set 450 or 451 includes an instance of the sensing transistor 250B and instances of two voltage reference transistors 250A and 250C implemented around the sensing transistor 250B in multiple directions (e.g., in the X-direction and the −X-direction). As discussed above, such a scheme allows for a more stable voltage reference, which improves the sensitivity of the semiconductor device 100. It is understood that the semiconductor device 100 may include additional sets of transistors (represented by a plurality of dots herein), but these additional sets are not specifically illustrated herein for reasons of simplicity.

In the embodiment shown in FIG. 17, the distance separating the adjacent transistors within the same set 450/451 is different from the distance separating adjacent sets 450-451. For example, within the set 450, the sensing transistor 250B is separated (or spaced apart) in the X-direction from the adjacent voltage reference transistor 250C by a distance 480. Meanwhile, a distance 490 separates the adjacent sets 450 and 451 (for example, separating the transistor 250C in the set 450 from the transistor 250A in the set 451) in the X-direction. The distance 490 is different from the distance 480. In some embodiments, the distance 490 is greater than the distance 480, which helps increase the electrical signal isolation between the adjacent sets 450 and 451. Stated differently, the increased distance 490 reduces the likelihood that the sensing transistor from the set 450 being adversely affected by electrical noise generated from the adjacent set 451, and vice versa.

Figure 18:
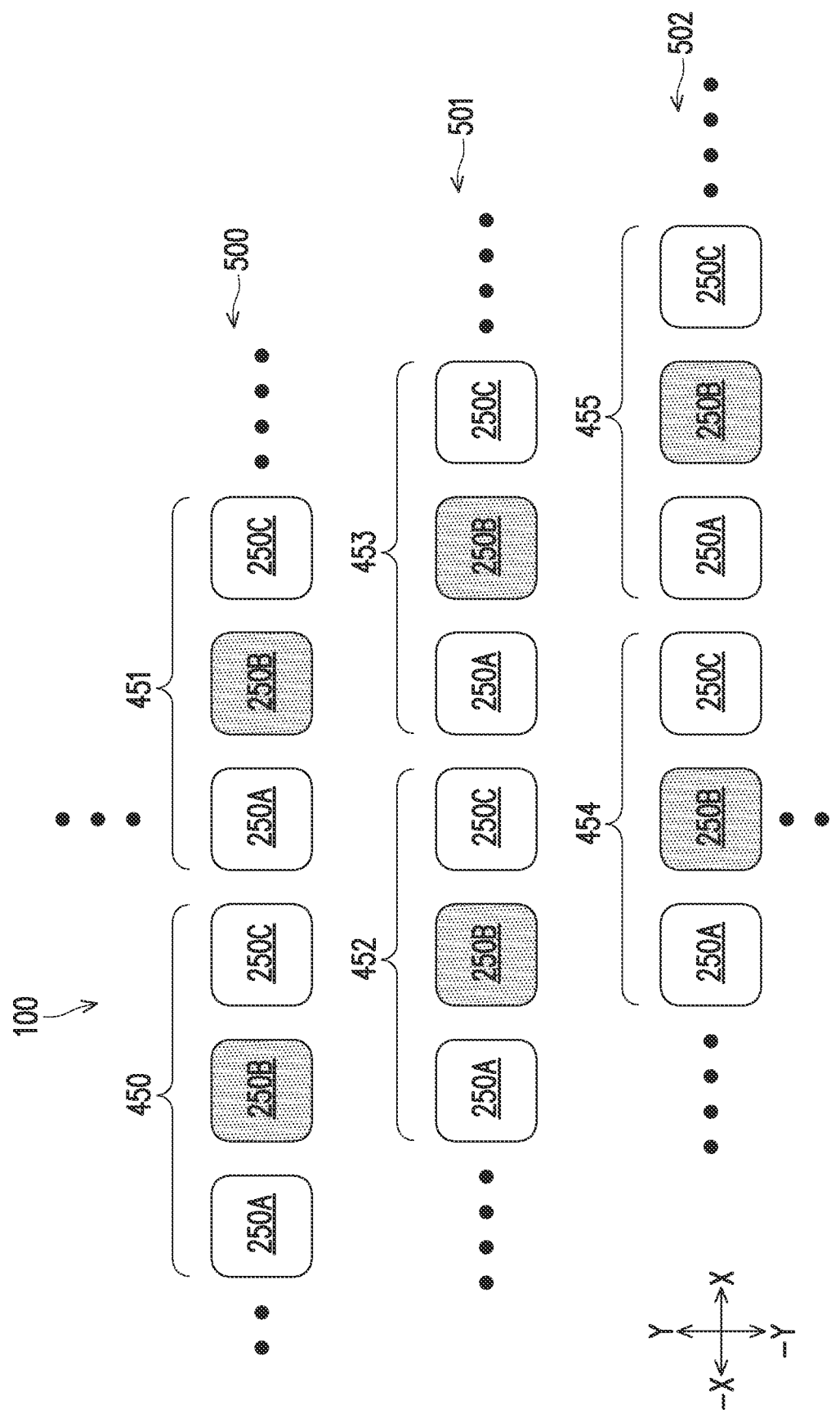
FIG. 18 illustrates a simplified planar top view of a semiconductor device 100 according to an embodiment of the present disclosure.

FIG. 18 illustrates a simplified planar top view of the semiconductor device 100 according to yet another embodiment of the present disclosure. As was the case for FIG. 17, FIG. 18 merely illustrates the transistors 250A-250C discussed above as separate blocks. In the embodiment of FIG. 18, the transistors are arranged into multiple rows that each extend in the X-direction but are spaced apart from one another in the Y-direction. For example, a row 500 includes the sets 450-451, a row 501 includes the sets 452-453, and a row 502 includes the sets 454-455, where each of the sets 450-455 includes an instance of the sensing transistor 250B and instances of the voltage reference transistors 250A and 250C. It is understood that each of the rows 500-502 may include additional sets of transistors (represented by a plurality of dots herein), but these additional sets are not specifically illustrated herein for reasons of simplicity.

One unique physical characteristic of the embodiment of FIG. 18 is that the sensing transistors 250B from adjacent rows are offset (or mis-aligned) from one another. For example, the sensing transistor 250B of the row 501 is laterally offset in the X-direction with respect to the sensing transistor 250B of the row 500. Likewise, the sensing transistor 250B of the row 502 is laterally offset in the X-direction with respect to the sensing transistor 250B of the row 501. Such a lateral offset or mis-alignment of the sensing transistors 250B is implemented to further reduce electrical interference between adjacent sets in the Y-direction. Had the sensing transistors 250B from the rows 500-501 (or rows 501-502) been aligned with each other, it would have led to a shorter electrical path between the sensing transistors 250B from adjacent rows. The shorter electrical path makes the sensing transistors 250B more prone to electrical interference from the sensing transistor from the adjacent row, which would have degraded the signal-to-noise ratio and lowered the sensitivity. Here, by laterally offsetting the sensing transistors 250B in the adjacent rows, each sensing transistor 250B is less prone to electrical interference from transistors of adjacent rows. Consequently, the signal-to-noise ratio and sensitivity of the semiconductor device as a whole can be improved.

FIGS. 19A-19B through 24A-24B illustrate cross-sectional side views of the semiconductor device 100 that demonstrate how methods can be performed to selectively sense or detect different types of miniature targets in the fluid sample 360 according to embodiments of the present disclosure. FIGS. 19A-19B through 24A-24B correspond to scenarios with a unique combination of the types of miniature targets in the fluid sample 360, the specific type of miniature target to be individually detected or sensed, and the method for doing so.

Referring now to FIGS. 19A-19B, the fluid sample 360 contains two types of miniature targets: large miniature targets 550 and small miniature targets 560. The large miniature targets 550 and the small miniature targets 560 may both be positively charged in this embodiment. The goal is to selectively detect or sense the presence of the large miniature targets 550. In order to achieve this goal, an AC (alternating current) voltage is applied to the voltage reference transistors 250A and 250C, which generates an oscillating electric field that attracts and repels the large miniature targets 550 and small miniature targets 560 to different locations. The size difference between the large miniature targets 550 and the small miniature targets 560 lead to different behaviors. For example, the large miniature targets 550 are heavier, and as such, they move more slowly within the fluid sample 360 in response to the oscillating electric field. In contrast, the small miniature targets 560 are lighter, and as such, they move more quickly within the fluid sample 360 in response to the oscillating electric field.

As shown in FIG. 19A, in a first part of an AC cycle, a negative voltage V− (e.g., in a range between about −1 volt and about −10 volts) is applied to the transistor 250A, while a positive voltage V+(e.g., in a range between about 1 volt and about 10 volts) is applied to the transistor 250C. This causes the large miniature targets 550 and the small miniature targets 560 within the fluid sample 360 to move toward the opening 340A (which is disposed directly above the transistor 250A), since the positively-charged large miniature targets 550 and small miniature targets 560 are attracted to the negative voltage V−. However, since the small miniature targets 560 are lighter, they can move faster within the fluid sample 360 than the large miniature targets 550. As a result, most of the small miniature targets 560 may have congregated within or over the opening 340A at the end of the first part of the AC cycle, while a substantial number of the large miniature targets 550 may still remain located within or over the openings 340B and 340C due to their slow-moving nature (i.e., since they are heavier).

In a second part of the AC cycle shown in FIG. 19B, a positive voltage V+ is applied to the transistor 250A, while a negative voltage V− is applied to the transistor 250C. This causes the large miniature targets 550 and the small miniature targets 560 within the fluid sample 360 to move toward the opening 340C (which is disposed directly above the transistor 250C), since the positively-charged large miniature targets 550 and small miniature targets 560 are attracted to the negative voltage V−, which is now applied to the transistor 250C instead of to the transistor 250A. Again, the relative lightness of the small miniature targets 560 allows them to congregate within or over the opening 340C at the end of the second part of the AC cycle, while the relative heaviness of the large miniature targets 550 means that a substantial number of them may still remain located within or over the openings 340A and 340B.

Based on the above discussion, it can be seen that during both parts of the AC cycle (which repeats indefinitely until turned off), a substantial number of the large miniature targets 550 remains within the opening 340B and are therefore detectable via the sensing transistor 250B. Meanwhile, the small miniature targets 560 mostly remain outside of the opening 340B and are therefore not detected by the sensing transistor 250B. Hence, the above scheme allows for the selective detection or sensing of the large miniature targets 550 when both the large miniature targets 550 and the small miniature targets 560 are positively charged.

Figures 20A, 20B:
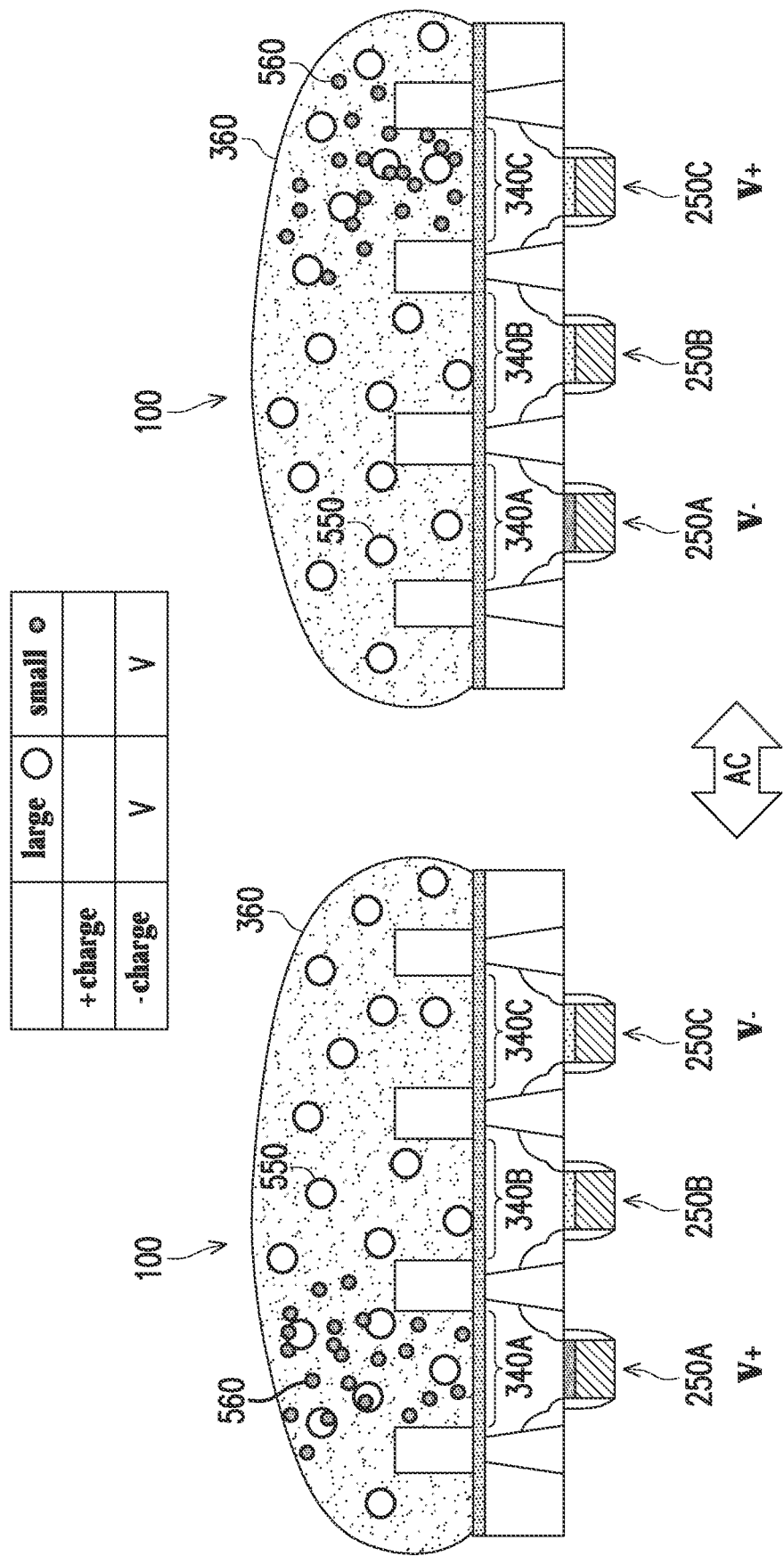

Referring now to FIGS. 20A-20B, the fluid sample 360 still contains the two types of miniature targets: large miniature targets 550 and small miniature targets 560. Unlike the embodiment of FIGS. 19A-19B, however, the large miniature targets 550 and the small miniature targets 560 may both be negatively charged in this embodiment. The goal is still to selectively detect or sense the presence of the large miniature targets 550. Again, an AC voltage is applied to the voltage reference transistors 250A and 250C to generate the oscillating electric field that attracts and repels the large miniature targets 550 and small miniature targets 560 to different locations.

In a first part of an AC cycle shown in FIG. 20A, a positive voltage V+ is applied to the transistor 250A, while a negative voltage V− is applied to the transistor 250C. This causes the large miniature targets 550 and the small miniature targets 560 within the fluid sample 360 to move toward the opening 340A, since the negatively-charged large miniature targets 550 and small miniature targets 560 are attracted to the positive voltage V+. However, since the small miniature targets 560 are lighter, they can move faster within the fluid sample 360 than the large miniature targets 550. As a result, most of the small miniature targets 560 may have congregated within or over the opening 340A at the end of the first part of the AC cycle, while a substantial number of the large miniature targets 550 may still remain located within or over the openings 340B and 340C due to their slow-moving nature.

In a second part of the AC cycle shown in FIG. 20B, a negative voltage V− is applied to the transistor 250A, while a positive voltage V+ is applied to the transistor 250C. This causes the large miniature targets 550 and the small miniature targets 560 within the fluid sample 360 to move toward the opening 340C, since the negatively-charged large miniature targets 550 and small miniature targets 560 are attracted to the positive voltage V+, which is now applied to the transistor 250C instead of to the transistor 250A. Again, the relative lightness of the small miniature targets 560 allows them to congregate within or over the opening 340C at the end of the second part of the AC cycle, while the relative heaviness of the large miniature targets 550 means that a substantial number of them may still remain located within or over the openings 340A and 340B.

Based on the above discussion, it can be seen that during both parts of the AC cycle (which repeats indefinitely until turned off), a substantial number of the large miniature targets 550 remains within the opening 340B and are therefore detectable via the sensing transistor 250B. Meanwhile, the small miniature targets 560 mostly remain outside of the opening 340B and are therefore not detected by the sensing transistor 250B. Hence, the above scheme allows for the selective detection or sensing of the large miniature targets 550 when both the large miniature targets 550 and the small miniature targets 560 are negatively charged.

Referring now to FIGS. 21A-21B, the fluid sample 360 still contains the two types of miniature targets: large miniature targets 550 and small miniature targets 560. Unlike the embodiments of FIGS. 19A-19B and 20A-20B, however, the large miniature targets 550 are positively charged while the small miniature targets 560 are negatively charged in the embodiments of FIGS. 21A-21B. The goal in the embodiment of FIG. 21A is to selectively detect or sense the presence of the large miniature targets 550. In order to achieve this goal, a positive DC (direct current) voltage V+(which may be a constant voltage) is applied to both of the voltage reference transistors 250A and 250C to simultaneously repel the positively charged large miniature targets 550 away from the openings 340A and 340C and to attract the negatively charged small miniature targets 560 to the openings 340A and 340C. As a result, the large miniature targets 550 mostly reside within the opening 340B, but the small miniature targets 560 reside outside of the opening 340B, which allows the large miniature targets 550 to be sensed by the sensing transistor 250B without interference from the small miniature targets 560.

The goal in the embodiment of FIG. 21B is to selectively detect or sense the presence of the small miniature targets 560. In order to achieve this goal, a negative DC voltage V− is applied to both of the voltage reference transistors 250A and 250C to simultaneously repel the negatively charged small miniature targets 560 away from the openings 340A and 340C and to attract the positively charged large miniature targets 550 to the openings 340A and 340C. As a result, the small miniature targets 560 mostly reside within the opening 340B, but the large miniature targets 550 reside outside of the opening 340B, which allows the small miniature targets 560 to be sensed by the sensing transistor 250B without interference from the large miniature targets 550.

Figure 22B:
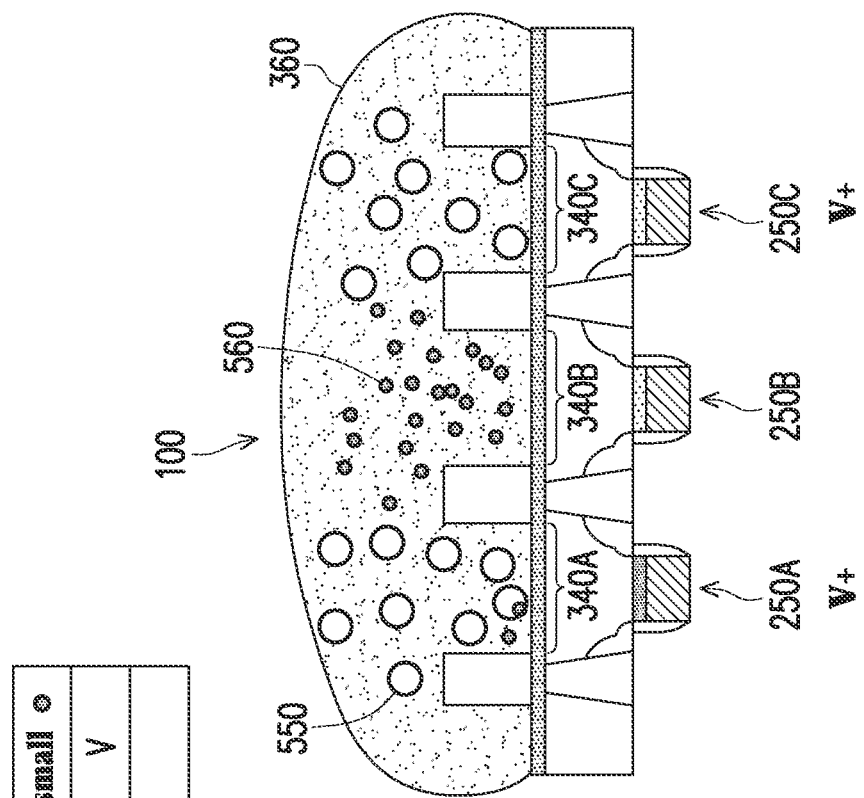
Figure 22A:
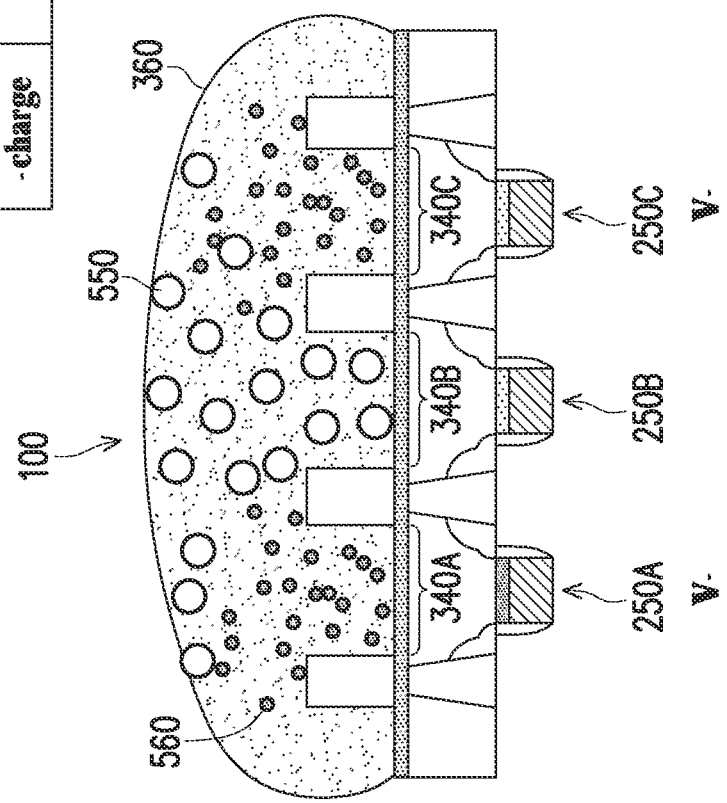

Referring now to FIGS. 22A-22B, the fluid sample 360 still contains the two types of miniature targets: large miniature targets 550 and small miniature targets 560. Unlike the embodiments discussed above, however, the large miniature targets 550 are negatively charged while the small miniature targets 560 are positively charged in the embodiments of FIGS. 22A-22B. The goal in the embodiment of FIG. 22A is to selectively detect or sense the presence of the large miniature targets 550. In order to achieve this goal, a negative DC voltage V− is applied to both of the voltage reference transistors 250A and 250C to simultaneously repel the negatively charged large miniature targets 550 away from the openings 340A and 340C and to attract the positively charged small miniature targets 560 to the openings 340A and 340C. As a result, the large miniature targets 550 mostly reside within the opening 340B, but the small miniature targets 560 reside outside of the opening 340B, which allows the large miniature targets 550 to be sensed by the sensing transistor 250B without interference from the small miniature targets 560.

The goal in the embodiment of FIG. 22B is to selectively detect or sense the presence of the small miniature targets 560. In order to achieve this goal, a positive DC voltage V+ is applied to both of the voltage reference transistors 250A and 250C to simultaneously repel the positively charged small miniature targets 560 away from the openings 340A and 340C and to attract the negatively charged large miniature targets 550 to the openings 340A and 340C. As a result, the small miniature targets 560 mostly reside within the opening 340B, but the large miniature targets 550 reside outside of the opening 340B, which allows the small miniature targets 560 to be sensed by the sensing transistor 250B without interference from the large miniature targets 550.

Figures 23A, 23B:
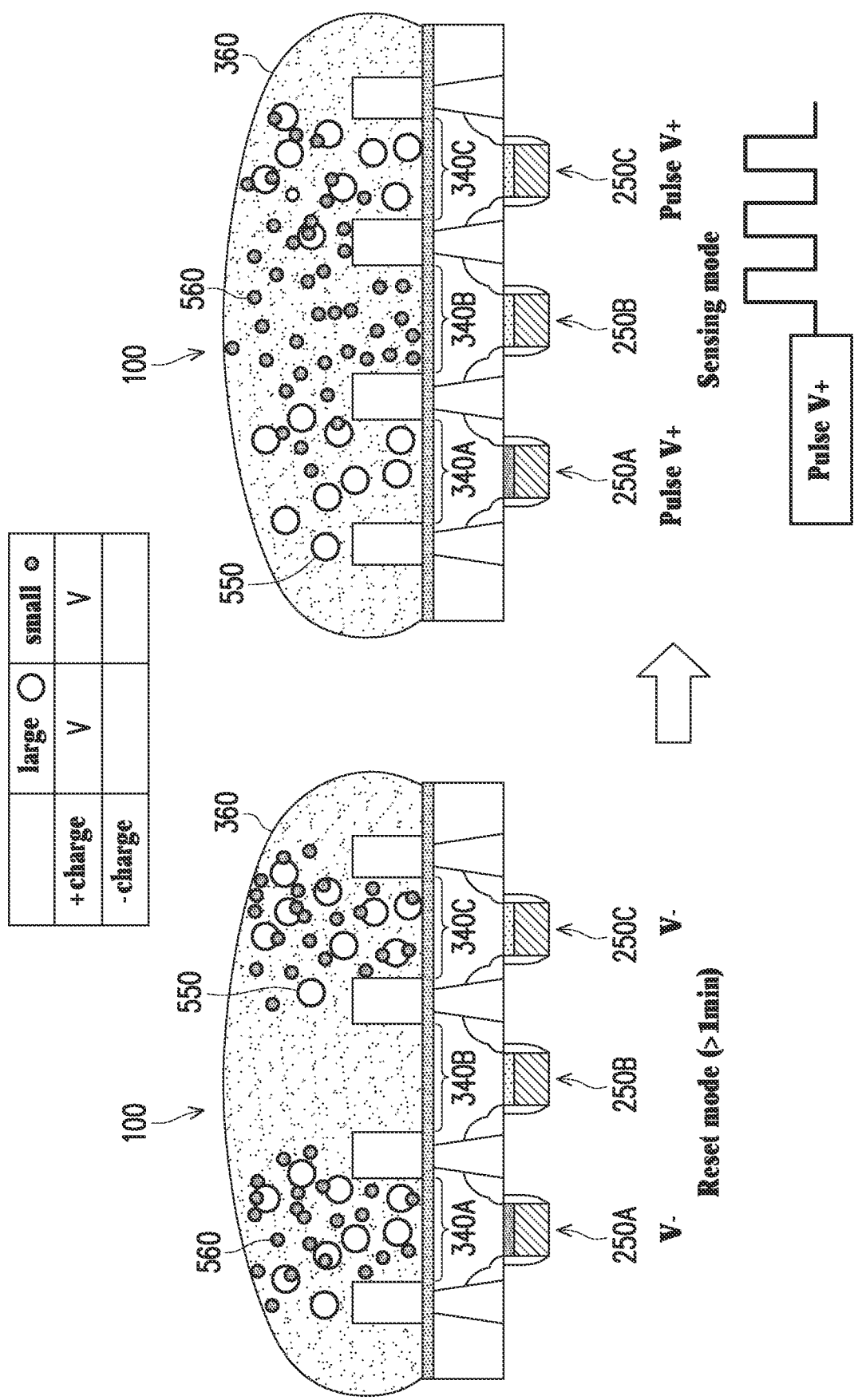

Referring now to FIGS. 23A-23B, the fluid sample 360 still contains the large miniature targets 550 and small miniature targets 560, and they are both positively charged in this embodiment, just like the embodiment of FIGS. 19A-19B. However, whereas the goal of the embodiment of FIGS. 19A-19B is to selectively detect or sense the presence of the large miniature targets 550, the goal of the embodiment of FIGS. 23A-23B is to selectively detect or sense the presence of the small miniature targets 560. In order to achieve this goal, two stages of sensing are implemented. The first stage of sensing is referred to as a reset mode, shown in FIG. 23A, where a constant negative DC voltage V− is applied to both of the voltage reference transistors 250A and 250C. This causes the large miniature targets 550 and the small miniature targets 560 (which are both positively charged herein) to be attracted to the voltage reference transistors 250A and 250C to move toward the openings 340A and 340C. The reset mode is performed for at least a predefined time duration, for example greater than 1 minute in some embodiments. The predefined time duration provides a sufficient amount of time for both the large miniature targets 550 and the small miniature targets 560 to move outside of the opening 340B and to substantially congregate within the openings 340A and 340B.

The second stage of sensing is referred to as a sensing mode, shown in FIG. 23B, where a positive pulsing voltage V+ is applied to both of the voltage reference transistors 250A and 250C. The pulsing voltage V+ has an opposite electrical polarity than the constant voltage V− applied during the reset mode. The positive pulsing voltage V+ swings from a low voltage of 0 volts to a high voltage of M volts, where M may be in a range between about 2 and 10 in some embodiments. For example, the positively pulsing voltage may swing between 0 volt and 5 volts repeatedly. The positive pulsing voltage V+ repels the small miniature targets 560 away from the openings 340A and 340C much faster than the large miniature targets 550, since the small miniature targets are lighter and therefore easier to move around within the fluid sample 360. As a result, the opening 340B is mostly filled with the small miniature targets 560 but very few (if any) large miniature targets 550. In this manner, the sensing transistor 250B can selectively sense or detect the presence of the small miniature targets 560 in the opening 340B without much interference from the large miniature targets 550, which are still mostly located in the openings 340A and 340C.

Figures 24A, 24B:
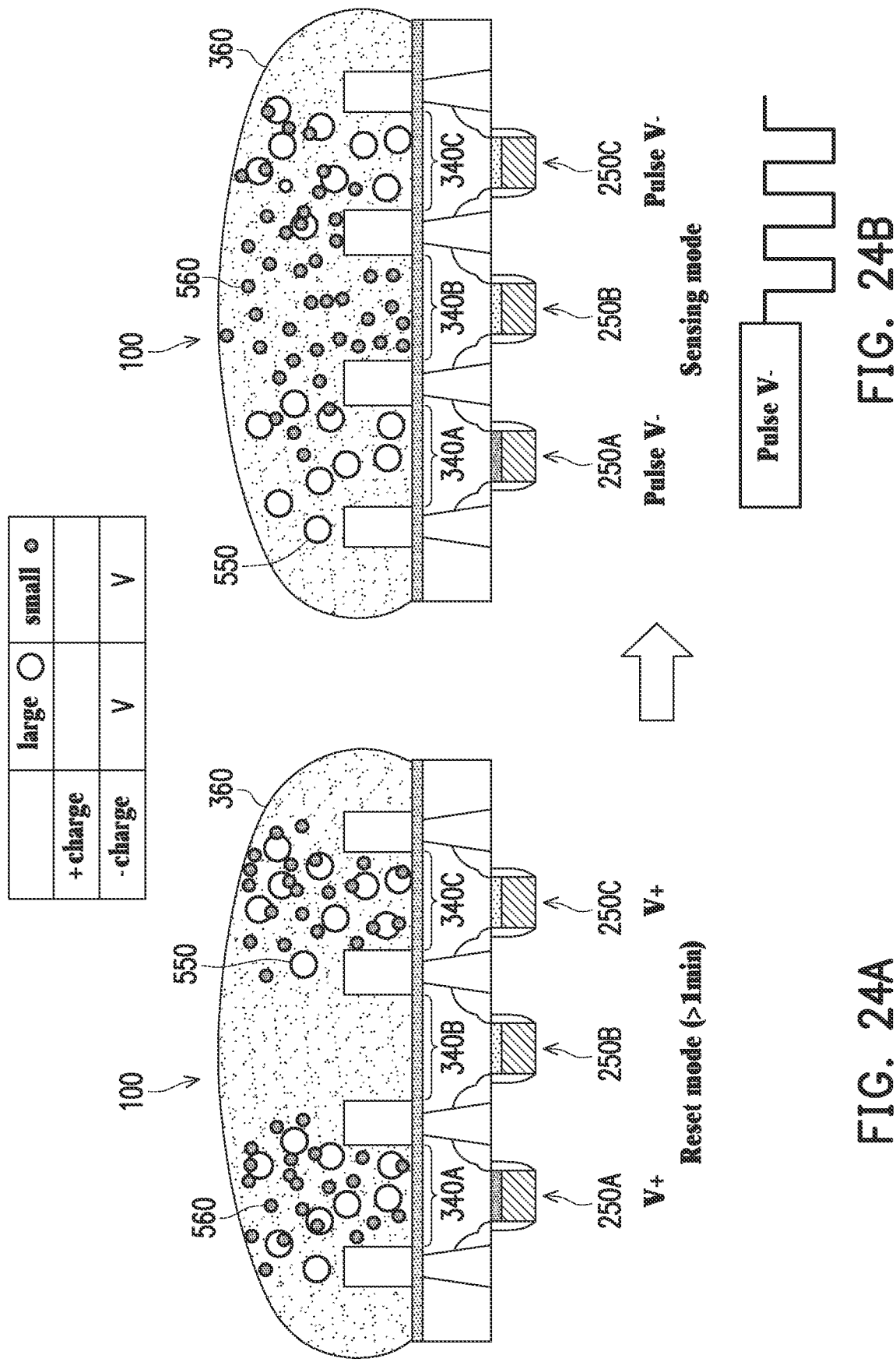

Referring now to FIGS. 24A-24B, the fluid sample 360 still contains the large miniature targets 550 and small miniature targets 560, and they are both negatively charged in this embodiment, just like the embodiment of FIGS. 20A-20B. However, whereas the goal of the embodiment of FIGS. 20A-20B is to selectively detect or sense the presence of the large miniature targets 550, the goal of the embodiment of FIGS. 24A-24B is to selectively detect or sense the presence of the small miniature targets 560. In order to achieve this goal, two stages of sensing are implemented, similar to the embodiment of FIGS. 23A-23B. In the first stage of sensing shown in FIG. 23A (i.e., the "reset mode"), a positive constant DC voltage V+ is applied to both of the voltage reference transistors 250A and 250C. This causes the large miniature targets 550 and the small miniature targets 560 (which are both negatively charged herein) to be attracted to the voltage reference transistors 250A and 250C to move toward the openings 340A and 340C. As was the case for the embodiment of FIG. 23A, the reset mode is performed for at least the predefined time duration, for example greater than 1 minute in some embodiments, so as to provide a sufficient amount of time for both the large miniature targets 550 and the small miniature targets 560 to move outside of the opening 340B and to substantially congregate within the openings 340A and 340C.

In the second stage of sensing shown in FIG. 23B (i.e., the "sensing mode"), a negative pulsing voltage V− is applied to both of the voltage reference transistors 250A and 250C. The pulsing voltage V− has an opposite electrical polarity than the constant voltage V+ applied during the reset mode. The negative pulsing voltage V− swings from a low voltage of −M volts to a high voltage of 0 volt, where M may be in a range between about 2 and 10 in some embodiments. For example, the negatively pulsing voltage may swing between −5 volts and 0 volt repeatedly. The negative pulsing voltage V− repels the small miniature targets 560 away from the openings 340A and 340C much faster than the large miniature targets 550, since the small miniature targets 560 are lighter and therefore easier to move around within the fluid sample 360. As a result, the opening 340B is mostly filled with the small miniature targets 560 but very few (if any) large miniature targets 550. In this manner, the sensing transistor 250B can selectively sense or detect the presence of the small miniature targets 560 in the opening 340B without much interference from the large miniature targets 550, which are still mostly located in the openings 340A and 340C.

Figure 25:
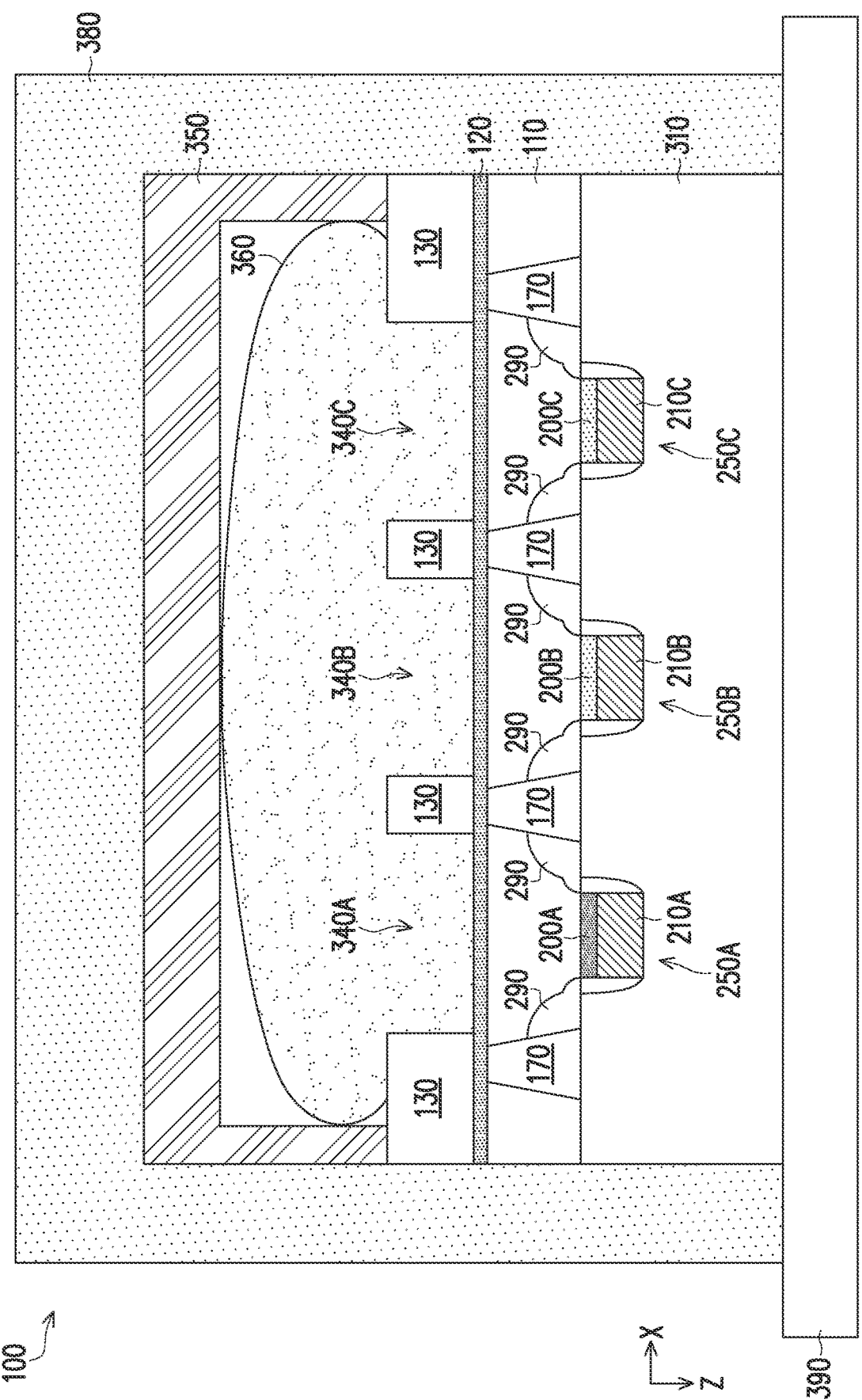
FIGS. 25-32 are diagrammatic fragmentary cross-sectional side views of a semiconductor device at various stages of fabrication according to various aspects of the present disclosure.
Figure 26:
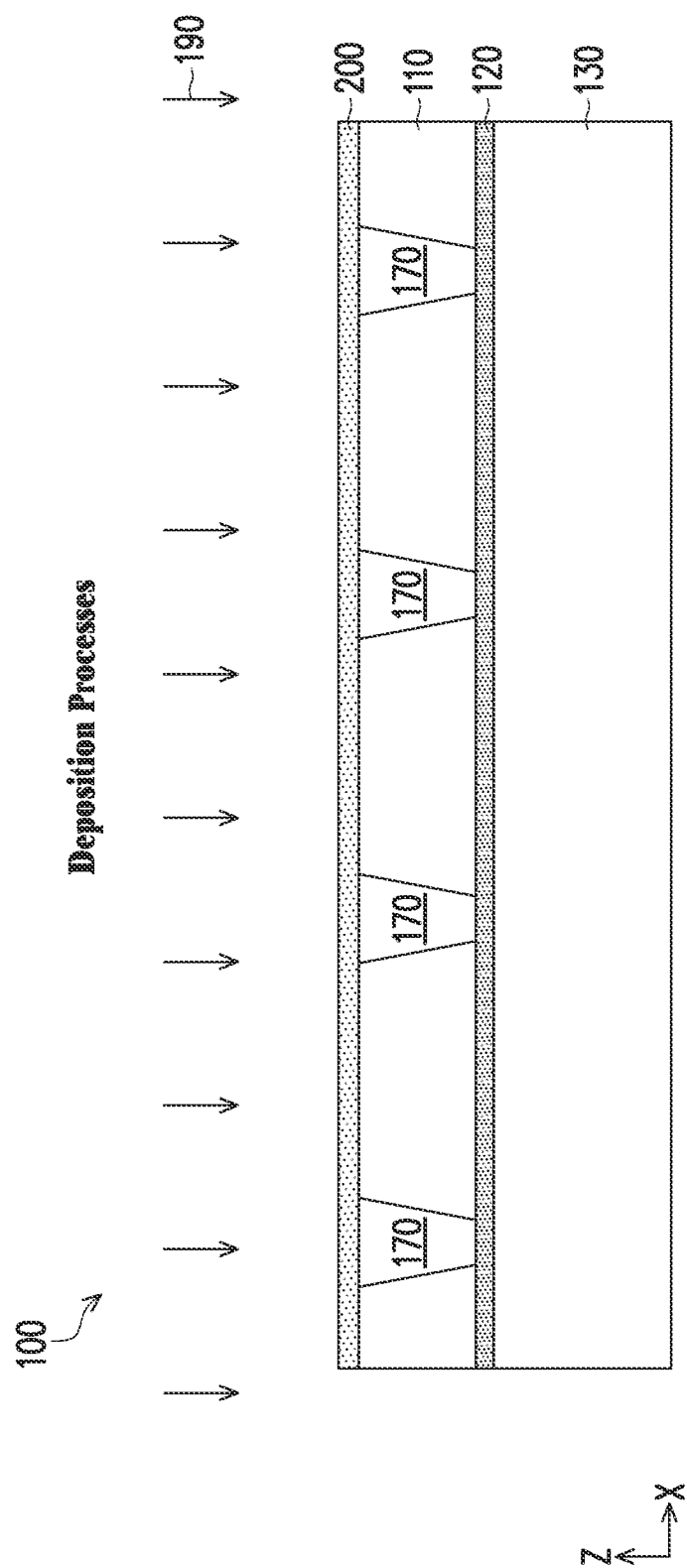

FIGS. 25-32 illustrate cross-sectional side view of other alternative embodiments of the semiconductor device 100. Again, similar components appearing in FIGS. 1-11 will be labeled the same in FIGS. 25-32 for reasons of consistency and clarity. Referring now to FIG. 25, the gate dielectric layer 200A of the voltage reference transistor 250A and the gate dielectric layer 200C of the voltage reference transistor 250C have different material compositions. In some embodiments, the gate dielectric layer 200A is a high-k dielectric material, while the gate dielectric layer 200C is a non-high-k dielectric material. In that regard, a high-k dielectric material is a dielectric material whose dielectric constant is greater than that of silicon oxide (~3.9). In some embodiments, the gate dielectric layer 200A contains hafnium oxide. In other embodiments, the gate dielectric layer may contain zirconium oxide, aluminum oxide, hafnium dioxide-alumina alloy, hafnium silicon oxide, hafnium silicon oxynitride, hafnium tantalum oxide, hafnium titanium oxide, hafnium zirconium oxide, or combinations thereof. Meanwhile, the gate dielectric layer 200C contains silicon oxide. In some embodiments, the gate dielectric layer 200A contains nitrogen, but the gate dielectric layer 200C does not contain nitrogen. It is understood that the material compositions of the gate dielectric layers 200A and 200C may be switched or reversed, such that the gate dielectric layer 200A has a non-high-k dielectric material composition (or is nitrogen-free), while the gate dielectric layer 200C has a high-k dielectric material composition (or contains nitrogen).

Figure 27:
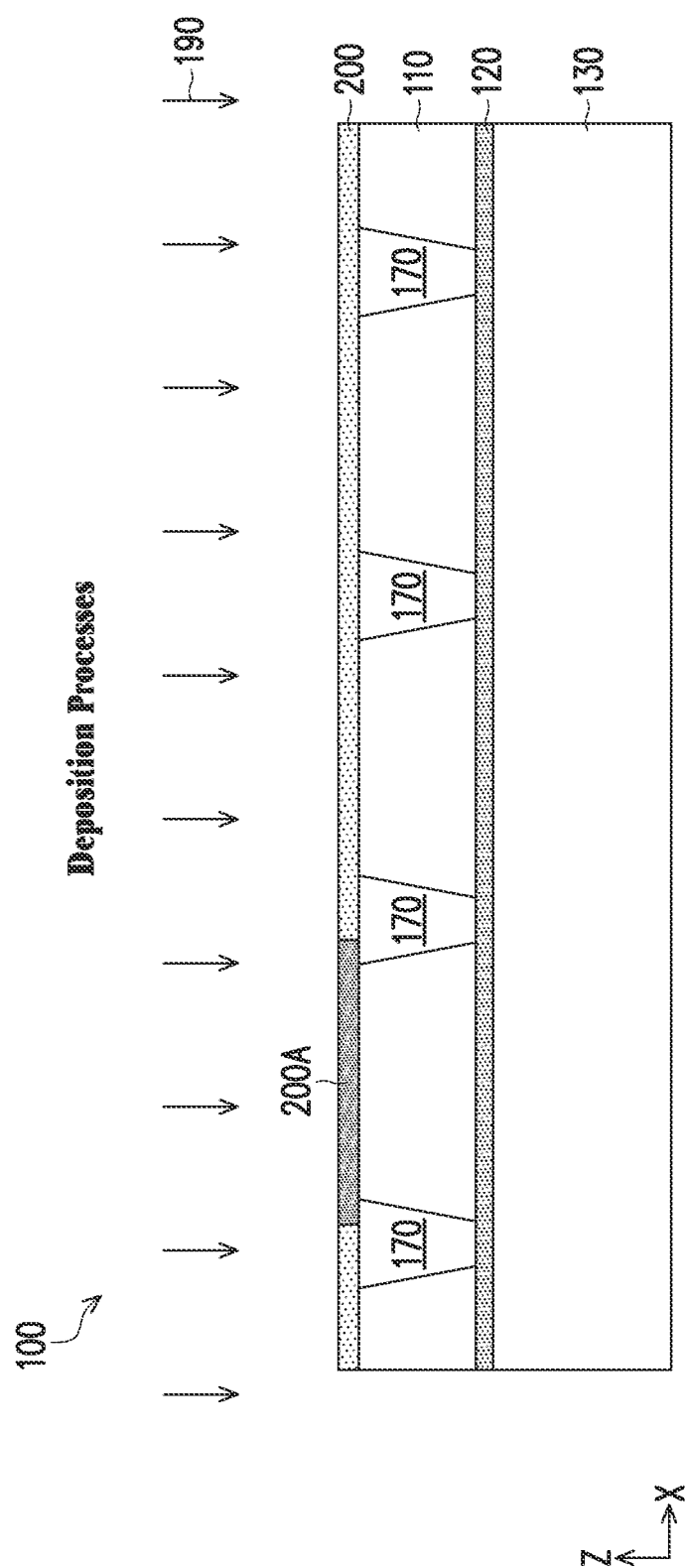

The different material compositions of the gate dielectric layers 200A and 200C may be achieved by making minor tweaks to the fabrication process flow discussed above with reference to FIGS. 1-11. For example, referring now to FIG. 26, which illustrates a stage of fabrication that is substantially the same as the stage discussed above with reference to FIG. 3. That is, one of the deposition processes 190 is performed to deposit a first type of dielectric material (e.g., a non-high-k dielectric material) as the gate dielectric layer 200. Thereafter, a patterning process is performed to the deposited first type of dielectric material to remove a portion thereof, as shown in FIG. 27. The removed portion may then be replaced by a second type of dielectric material different from the first type. The rest of the fabrication processes may remain substantially the same. When the semiconductor device 100 undergoes the patterning process 240 (see FIG. 4) to form the individual gates 245A-245C, the gate dielectric layer 200A will have a different material composition than the gate dielectric layer 200C, which is an inherent result of the unique fabrication process flow performed herein.

The different material compositions of the gate dielectric layers 200A and 200C may further facilitate the selective detection of a particular type of miniature targets from a fluid that contains multiple types of miniature targets (as was the case in FIGS. 19A-19B through 24A-24B). In that regard, the strength of the voltage reference signal provided by a voltage reference transistor may be tuned by configuring the material composition of its gate dielectric layer. For example, by using a high-k dielectric material as the gate dielectric layer (or by introducing nitrogen to the gate dielectric layer), the strength of capacitive coupling may be altered compared to the other gate dielectric layer that is implemented using silicon oxide. This difference in the strength of capacitive coupling may bolster the oscillating AC electric field discussed above in the embodiments of FIGS. 19A-19B and 20A-20B. This leads to an even easier or better separation of the large miniature targets 550 and the small miniature targets 560 in the embodiments of FIGS. 19A-19B and 20A-20B.

Figure 28:
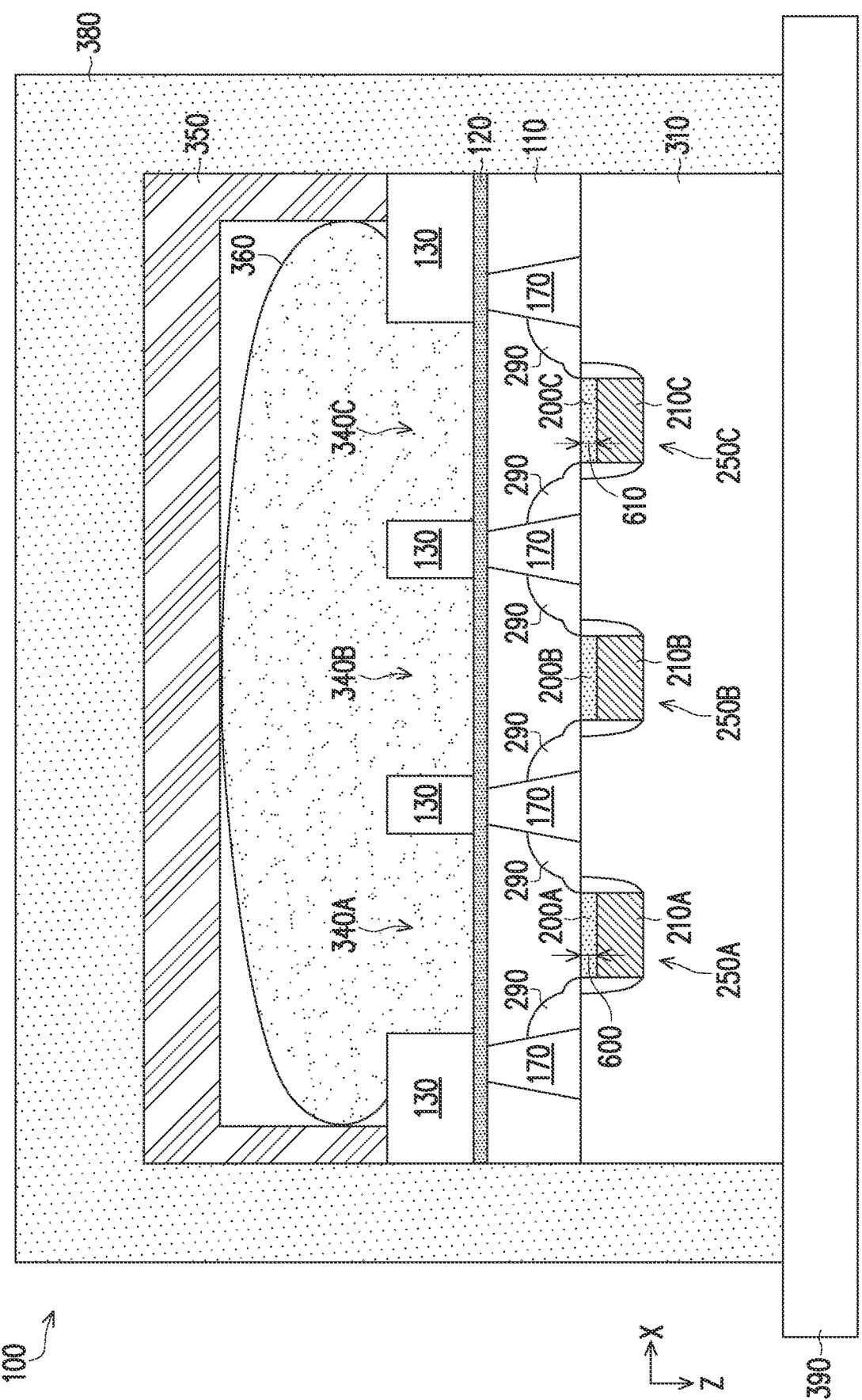
Figure 29:
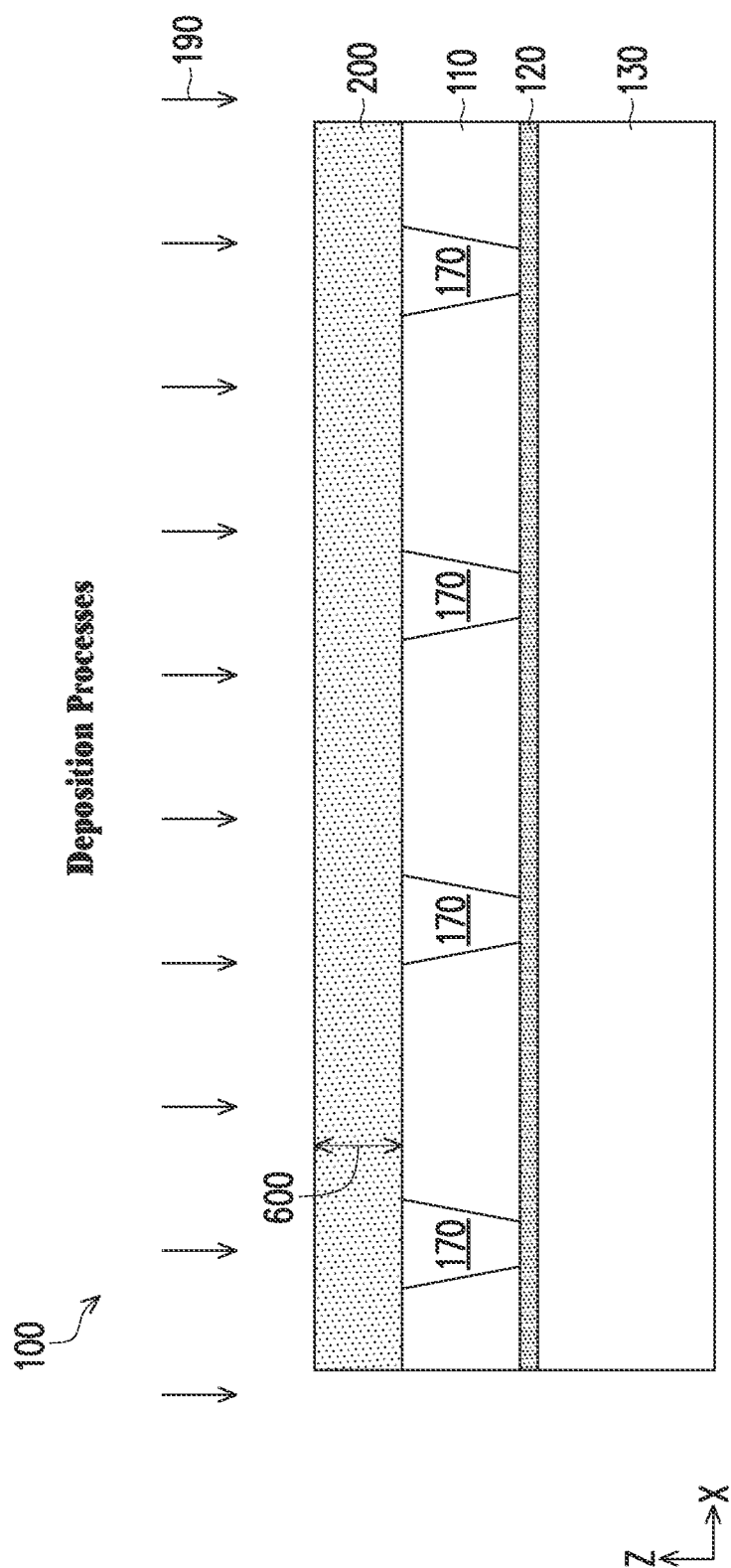
Figure 30:
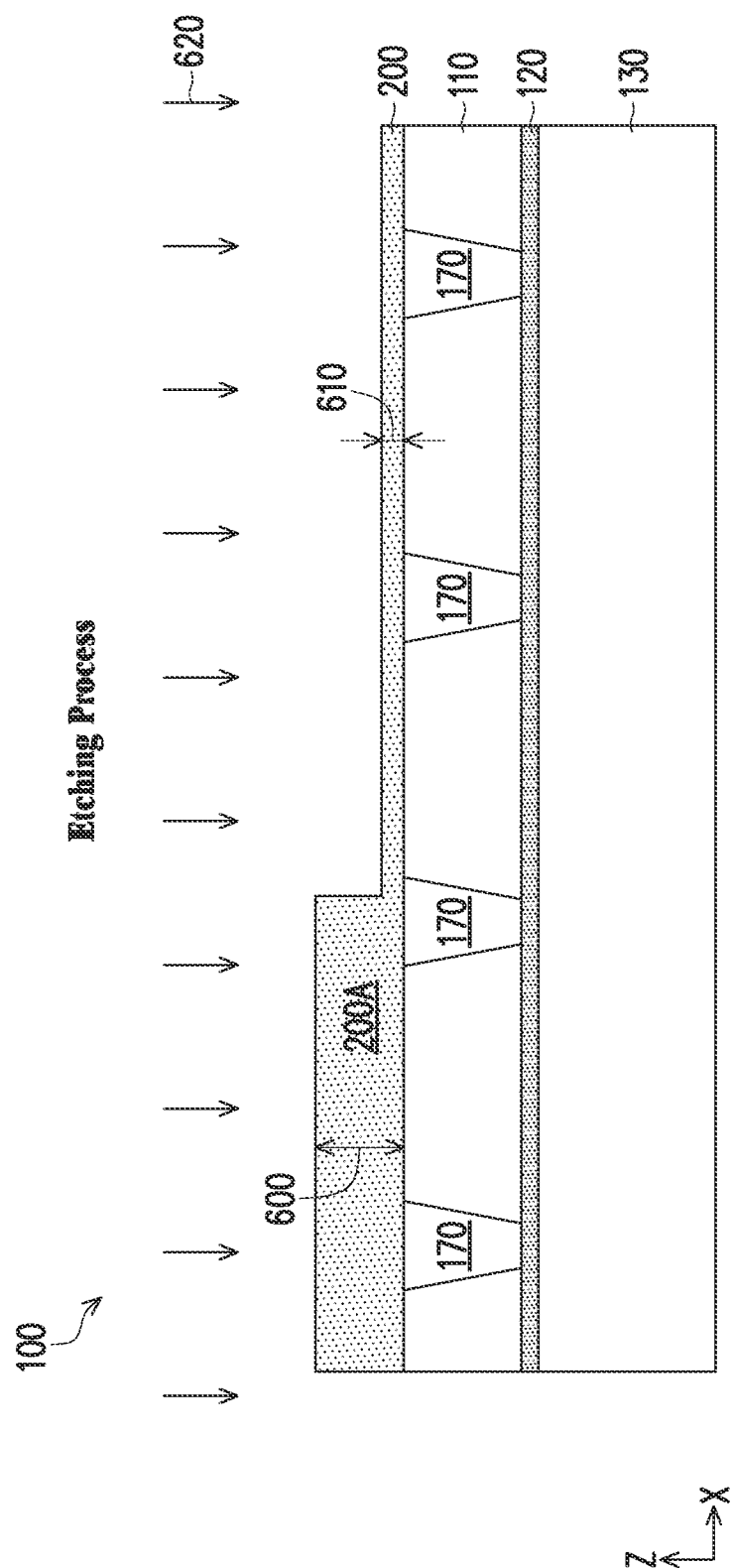

Referring now to FIG. 28, rather than having different material compositions, the gate dielectric layer 200A and the gate dielectric layer 200C have different thicknesses instead. For example, the gate dielectric layer 200A has a thickness 600, while the gate dielectric layer 200C has a thickness 610. The thickness 600 and the thickness 610 have different values. For example, a ratio of the thickness 600 and the thickness 610 may be in a range between about 1 nanometer (nm) and about 10 nm. The difference in the thicknesses 600 and 610 also bolsters the oscillating AC electric field discussed above in the embodiments of FIGS. 19A-19B and 20A-20B, since the different thicknesses 600 and 610 lead to different capacitive coupling strengths for their respective voltage reference transistors 250A and 250C. The ratio between the thickness 600 and the 610 discussed above is not randomly chosen but specifically configured to facilitate the bolstering of the oscillating AC electric field. Had the above ratio been too small (meaning there is not much of a difference between the thicknesses 600 and 610), the bolstering effect on the oscillating AC electric field would have been minimal. On the other hand, had the above ratio been too big (meaning that the gate dielectric layer 200A is much thicker than the gate dielectric layer 200C, or vice versa), it could interfere with the intended operation of the respective voltage transistor, and/or lead to fabrication difficulties. Here, the ratio range is optimized to provide a helpful boost to the oscillating AC electric field while minimizing potentially negative ramifications.

The different thicknesses 600 and 610 of the gate dielectric layers 200A and 200C may also be achieved by making minor tweaks to the fabrication process flow discussed above with reference to FIGS. 1-11. For example, referring now to FIG. 29, which illustrates a stage of fabrication that is similar to the stage discussed above with reference to FIG. 3, where one of the deposition processes 190 is performed to deposit the gate dielectric layer 200. However, the gate dielectric layer 200 may be formed much thicker in this embodiment. For example, the gate dielectric layer 200 is formed to have the thickness 600. Thereafter, in a subsequent process shown in FIG. 30, an etching process 620 may be performed to the gate dielectric layer 200 to selectively reduce the thickness of a portion thereof down to the thickness 610. It is understood that a patterned mask (e.g., a photoresist mask) may first be formed to cover up a portion of the gate dielectric layer 200A whose thickness 600 is not supposed to be reduced. The etching process 620 may be performed while such a patterned mask serves as a protective mask to protect the portion of the gate dielectric layer 200A therebelow from being etched. The rest of the fabrication processes may remain substantially the same. When the semiconductor device 100 undergoes the patterning process 240 (see FIG. 4) to form the individual gates 245A-245C, the gate dielectric layer 200A will have a different thickness than the gate dielectric layer 200C (e.g., the thickness 600 vs the thickness 610), which is an inherent result of the unique fabrication process flow performed herein.

Figure 31:
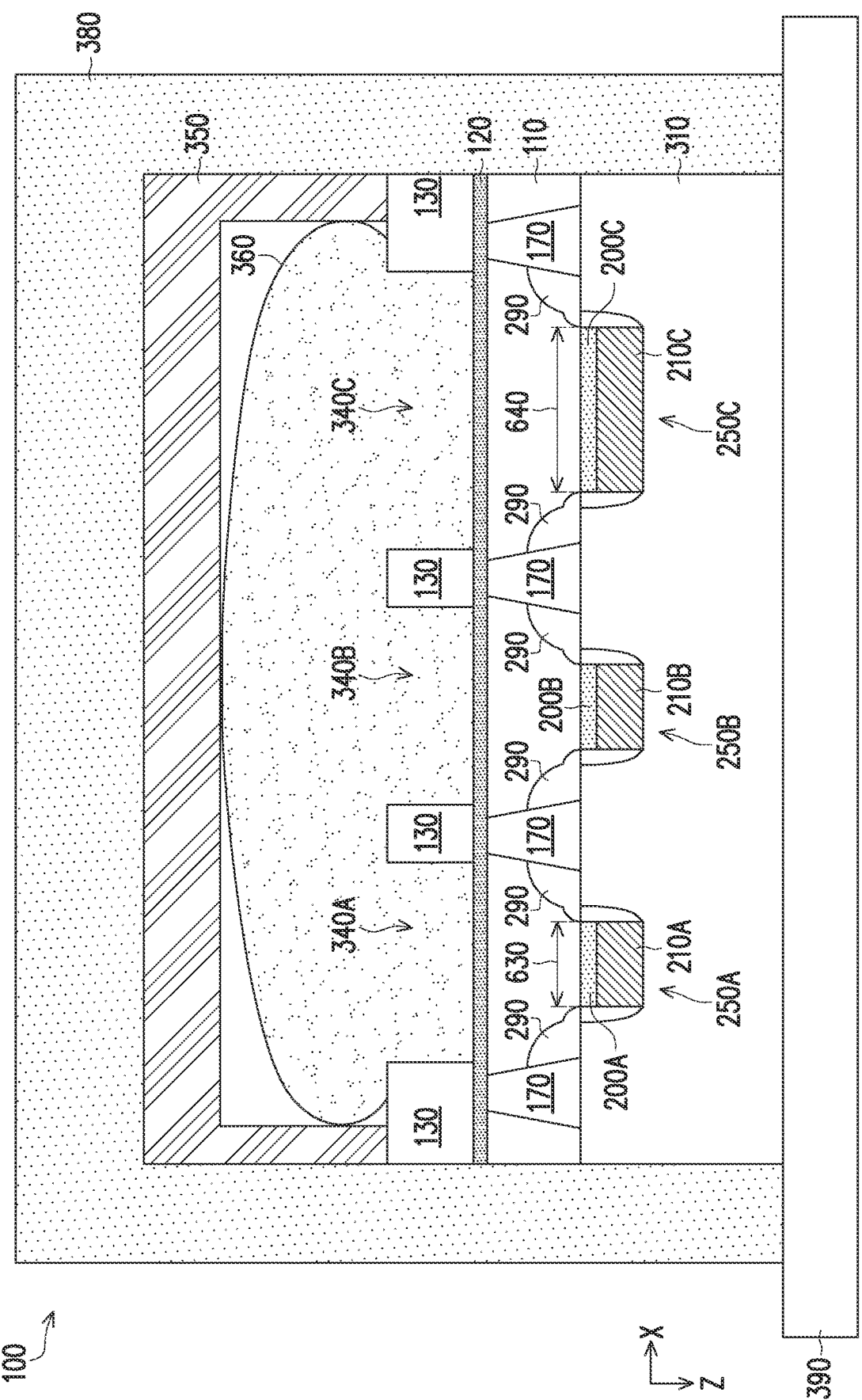
Figure 32:
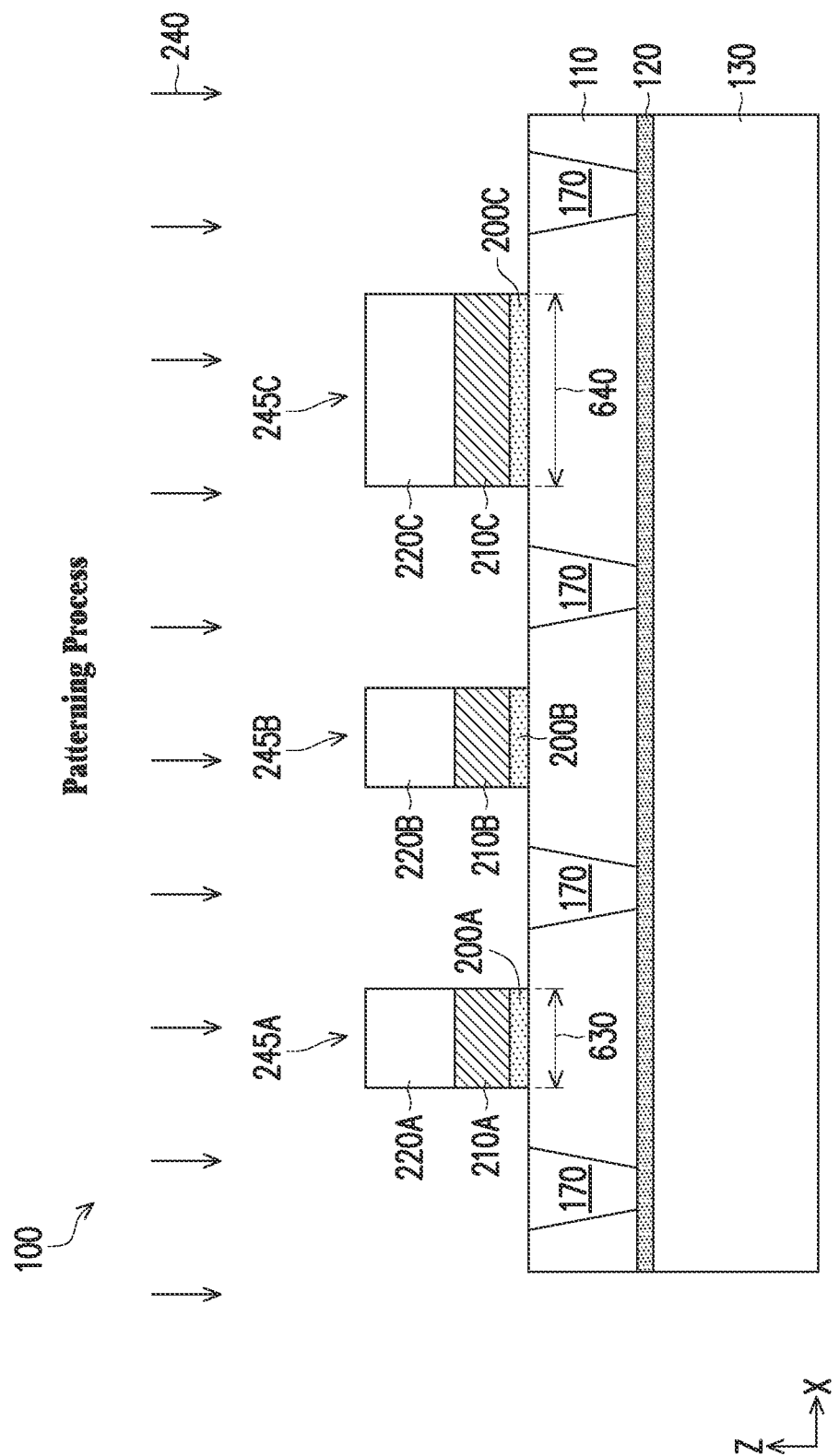

Referring now to FIG. 31, the gate dielectric layer 200A and the gate dielectric layer 200C are implemented with different lateral dimensions in yet another alternative embodiment. For example, the gate dielectric layer 200A is implemented with a lateral dimension 630, while the gate dielectric layer 200C is implemented with a lateral dimension 640 that is different from the lateral dimension 630. In the embodiment shown in FIG. 27, the lateral dimensions 630 and 640 each extend in the X-direction, but the lateral dimension 640 is substantially greater than the lateral dimension 630. In some embodiments, a ratio of the lateral dimension 640 and the lateral dimension 630 may be in a range between about 0.05:1 and about 20:1. Such a ratio is not randomly chosen but specifically configured to optimize the performance of the semiconductor device 100. For example, this ratio is large enough such that the longer transistor 250C provides a sufficient buffer against potential electrical interference (in the form of electrical noise) from a nearby transistor located to the "right" of the transistor 250C in the X-direction. In other words, for the electrical noise to reach the sensing transistor 250B, it would have to travel a much longer distance (due to the expanded lateral size of the transistor 250C). This causes the dissipation of the noise and weakens it, thereby minimizing its harmful impact on the sensing task of the sensing transistor 250B. However, the above ratio between the lateral dimensions 640 and 630 is not too large, since that would have taken up precious chip real estate, which would have led to an increase in the cost of fabrication of the semiconductor device 100. In other words, the range of the above ratio is optimized to the point that it does not lead to diminishing returns.

Again, the different lateral dimensions 630 and 640 of the gate dielectric layers 200A and 200C may be achieved by making minor tweaks to the fabrication process flow discussed above with reference to FIGS. 1-11. For example, referring now to FIG. 32, which illustrates a stage of fabrication that is similar to the stage discussed above with reference to FIG. 4, where the patterning process 240 is performed to pattern the gate dielectric layer 200 and the gate electrode layer 210 into individual gates 245A-245C. However, the gate 245C is patterned to have the wider lateral dimension 640, while the gate 245A is patterned to have the narrower lateral dimension 630. The rest of the fabrication processes may remain substantially the same. Again, the different lateral sizes of the gates 245A and 245C is an inherent result of the unique fabrication process flow performed herein.

It is understood that although the embodiments of FIGS. 25-32 describe differences between the material compositions, thicknesses, and lateral sizes of the voltage reference transistors 250A and 250C, these differences may also apply to the sensing transistor 250B in certain embodiments as well. For example, the sensing transistor 250B may be implemented to have a different material composition, a different thickness, and/or a different lateral dimension than either (or both) of the voltage reference transistors 250A and 250C in some embodiments, depending on design needs and fabrication requirements.

Figure 33:
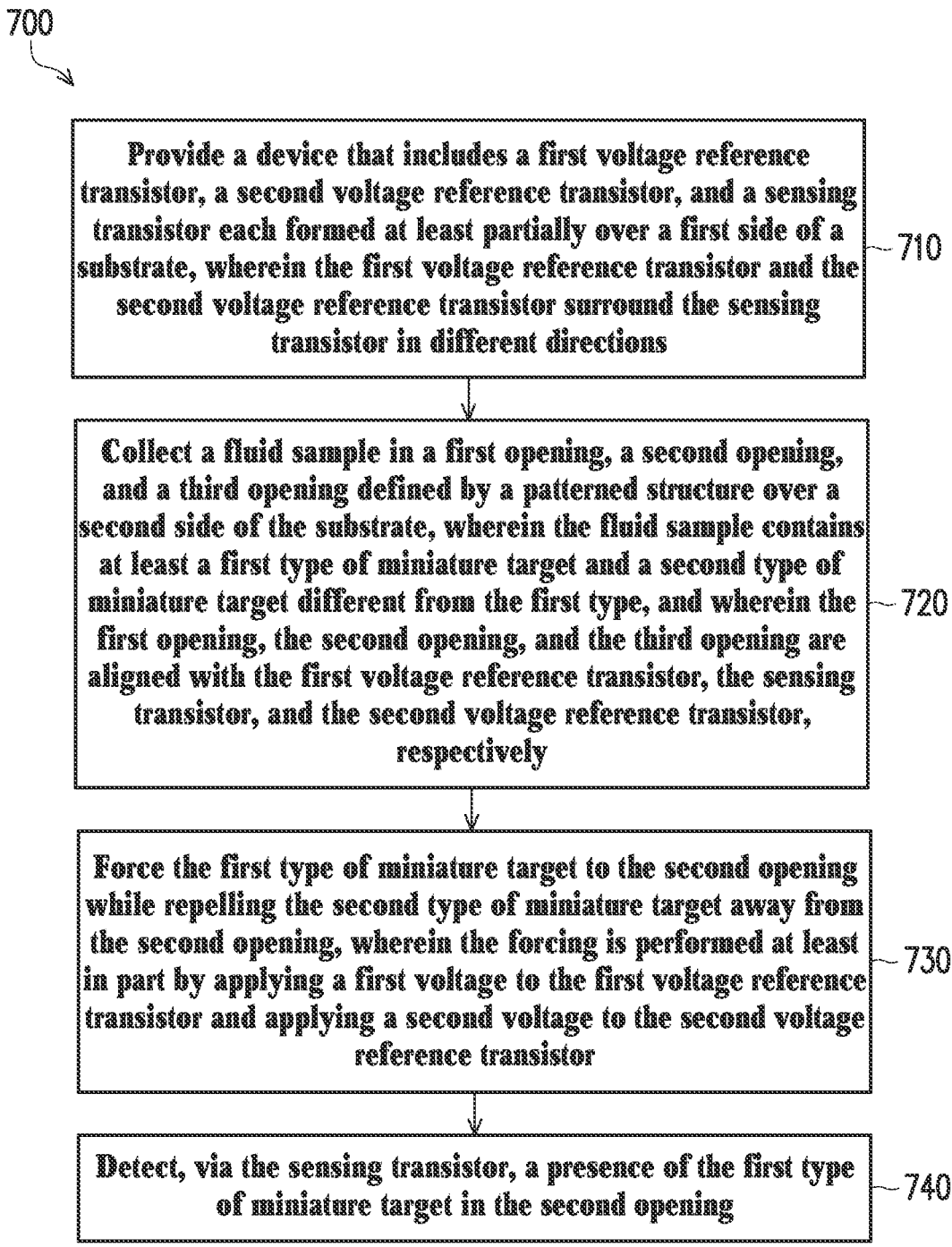
FIG. 33 illustrates a flowchart of a method according to various aspects of the present disclosure.

FIG. 33 is a flowchart illustrating a method 700 of detecting a miniature target in a fluid sample using a semiconductor device according to embodiments of the present disclosure. The method 700 includes a step 710 to provide a device that includes a first voltage reference transistor, a second voltage reference transistor, and a sensing transistor each formed at least partially over a first side of a substrate. The first voltage reference transistor and the second voltage reference transistor surround the sensing transistor in different directions.

The method 700 includes a step 720 to collect a fluid sample in a first opening, a second opening, and a third opening defined by a patterned structure over a second side of the substrate. The fluid sample contains at least a first type of miniature target and a second type of miniature target different from the first type. The first opening, the second opening, and the third opening are aligned with the first voltage reference transistor, the sensing transistor, and the second voltage reference transistor, respectively.

The method 700 includes a step 730 to force the first type of miniature target to the second opening while repelling the second type of miniature target away from the second opening. The step 730 is performed at least in part by applying a first voltage to the first voltage reference transistor and applying a second voltage to the second voltage reference transistor.

The method 700 includes a step 740 to detect, via the sensing transistor, a presence of the first type of miniature target in the second opening.

In some embodiments, the step 730 includes applying oscillating voltages to the first voltage reference transistor and the second voltage reference transistor. The oscillating voltage swings from a positive voltage to a negative voltage in each cycle of oscillation.

In some embodiments, the step 730 includes applying a constant voltage to the first voltage reference transistor and to the second voltage reference transistor. A positive constant voltage or a negative constant voltage is applied to both the first voltage reference transistor and to the second voltage reference transistor.

In some embodiments, the step 730 includes a reset mode during which a constant voltage is applied to both the first voltage reference transistor and the second voltage reference transistor, as well as a sensing mode that occurs after the reset mode, wherein a pulsing voltage is applied to both the first voltage reference transistor and the second voltage reference transistor. In some embodiments, the pulsing voltage has an opposite electrical polarity than the constant voltage applied during the reset mode, and the pulsing voltage swings between 0 volts to a predefined positive voltage, or between a predefined negative voltage to 0 volts.

In some embodiments, the first type of miniature target is substantially greater in size than the second type of miniature target, or the first type of miniature target is substantially smaller in size than the second type of miniature target.

In some embodiments, the first type of miniature target and the second type of miniature target are both positively charged, or the first type of miniature target and the second type of miniature target are both negatively charged.

In some embodiments, the first type of miniature target is positively charged, and the second type of miniature target is negatively charged. In other embodiments, the first type of miniature target is negatively charged, and the second type of miniature target is positively charged.

In some embodiments, the one or more predefined miniature targets include: an ion, a nucleic acid, a polarized molecule, an antigen, an antibody, an enzyme, a cell, a protein, a virus, or a bacterium.

It is understood that the method 700 may include further steps performed before, during, or after the steps 710-740. For reasons of simplicity, other additional steps are not discussed herein in detail.

Figure 34:
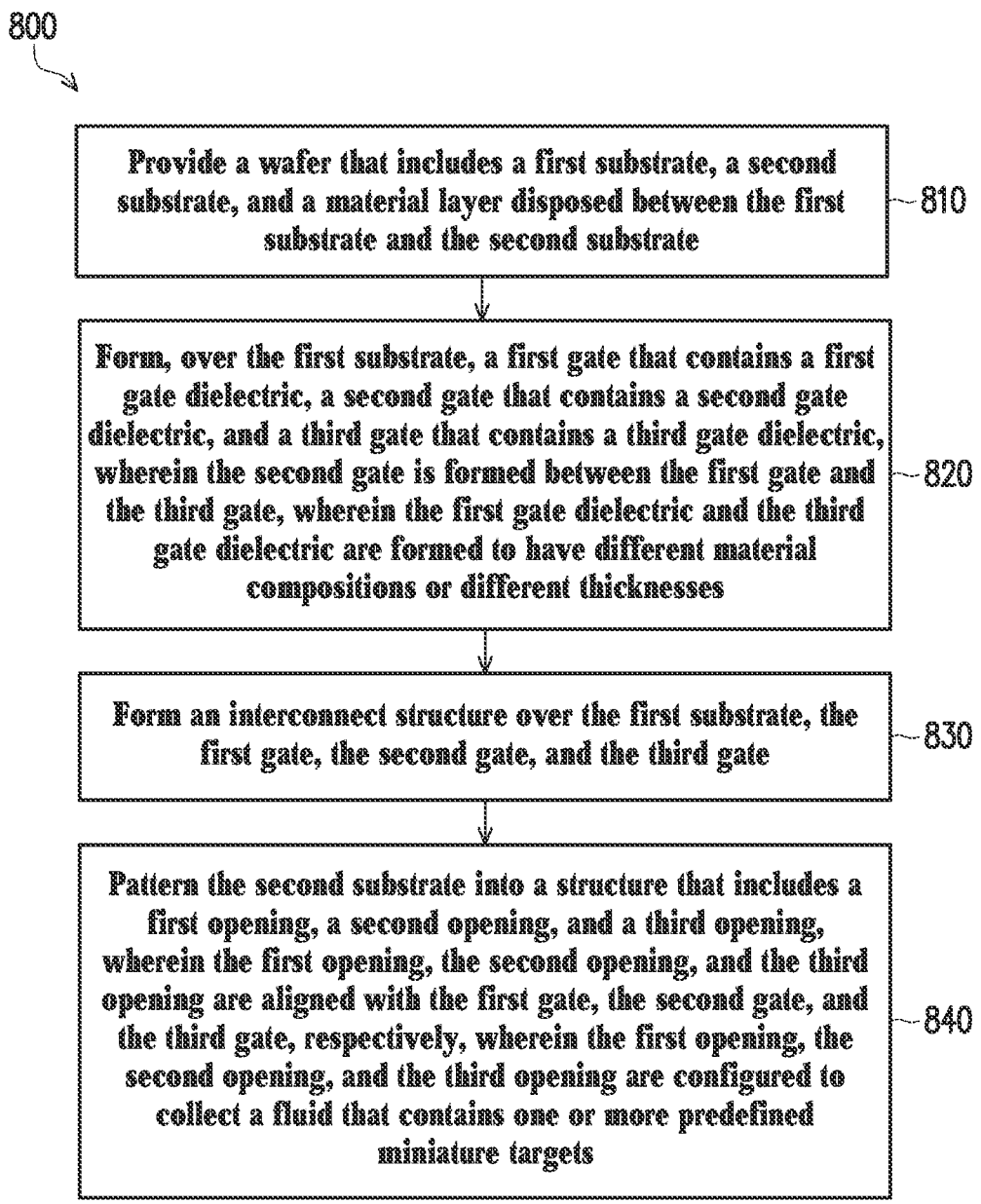
FIG. 34 illustrates a flowchart of a method according to various aspects of the present disclosure.

FIG. 34 is a flowchart illustrating a method 800 of fabricating a semiconductor device according to embodiments of the present disclosure. The method 800 includes a step 810 to provide a wafer that includes a first substrate, a second substrate, and a material layer disposed between the first substrate and the second substrate.

The method 800 includes a step 820 to form, over the first substrate, a first gate that contains a first gate dielectric, a second gate that contains a second gate dielectric, and a third gate that contains a third gate dielectric. The second gate is formed between the first gate and the third gate. The first gate dielectric and the third gate dielectric are formed to have different material compositions or different thicknesses.

The method 800 includes a step 830 to form an interconnect structure over the first substrate, the first gate, the second gate, and the third gate.

The method 800 includes a step 840 to pattern the second substrate into a structure that includes a first opening, a second opening, and a third opening. The first opening, the second opening, and the third opening are aligned with the first gate, the second gate, and the third gate, respectively. The first opening, the second opening, and the third opening are configured to collect a fluid that contains one or more predefined miniature targets.

In some embodiments, the forming the first gate, the second gate, and the third gate is performed such that the first gate and the third gate have different lateral dimensions.

In some embodiments, the one or more predefined miniature targets include: an ion, a nucleic acid, a polarized molecule, an antigen, an antibody, an enzyme, a cell, a protein, a virus, or a bacterium.

It is understood that the method 800 may include further steps performed before, during, or after the steps 810-840. For example, the method 800 may include a steps to form, in the first substrate, a first set of source/drains on opposite side of the first gate, a second set of source/drains on opposite side of the second gate, and a third set of source/drains on opposite side of the third gate. The first set of source/drains and the first gate form a first voltage reference transistor. The second set of source/drains and the second gate form a miniature-target-sensing transistor. The third set of source/drains and the third gate form a second voltage reference transistor. As another example, the method 800 may include a step of electrically operating the first voltage reference transistor, the second voltage reference transistor, and the miniature-target-sensing transistor to detect a predefined type of miniature targets disposed in the second opening. For reasons of simplicity, other additional steps are not discussed herein in detail.

Figure 35:
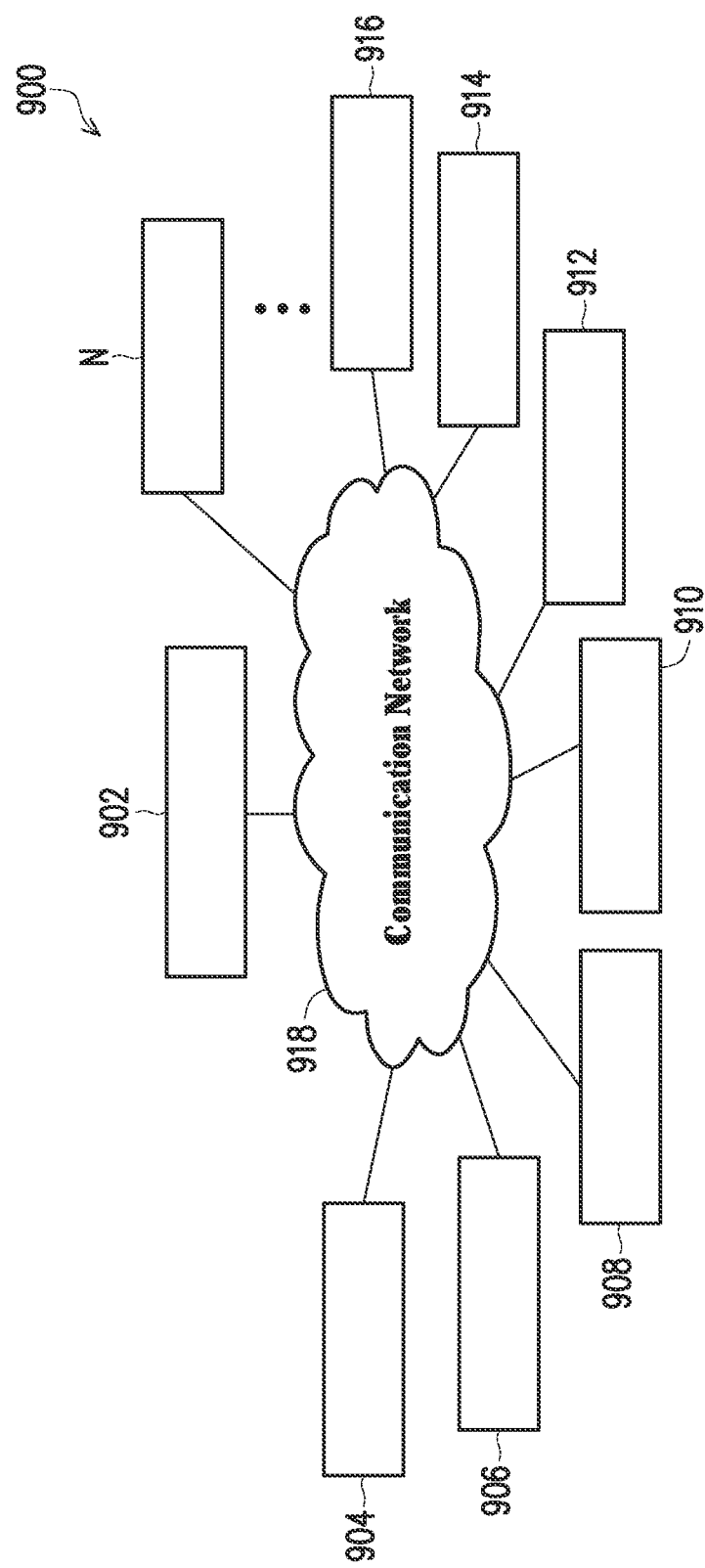
FIG. 35 is a block diagram of a manufacturing system according to various aspects of the present disclosure.

FIG. 35 illustrates an integrated circuit fabrication system 900 according to embodiments of the present disclosure. The fabrication system 900 includes a plurality of entities 902, 904, 906, 908, 910, 912, 914, 916 . . . , N that are connected by a communications network 918. The network 918 may be a single network or may be a variety of different networks, such as an intranet and the Internet, and may include both wire line and wireless communication channels.

In an embodiment, the entity 902 represents a service system for manufacturing collaboration; the entity 904 represents an user, such as product engineer monitoring the interested products; the entity 906 represents an engineer, such as a processing engineer to control process and the relevant recipes, or an equipment engineer to monitor or tune the conditions and setting of the processing tools; the entity 908 represents a metrology tool for IC testing and measurement; the entity 910 represents a semiconductor processing tool, such an EUV tool that is used to perform lithography processes to define the gate spacers of an SRAM device; the entity 912 represents a virtual metrology module associated with the processing tool 910; the entity 914 represents an advanced processing control module associated with the processing tool 910 and additionally other processing tools; and the entity 916 represents a sampling module associated with the processing tool 910.

Each entity may interact with other entities and may provide integrated circuit fabrication, processing control, and/or calculating capability to and/or receive such capabilities from the other entities. Each entity may also include one or more computer systems for performing calculations and carrying out automations. For example, the advanced processing control module of the entity 914 may include a plurality of computer hardware having software instructions encoded therein. The computer hardware may include hard drives, flash drives, CD-ROMs, RAM memory, display devices (e.g., monitors), input/output device (e.g., mouse and keyboard). The software instructions may be written in any suitable programming language and may be designed to carry out specific tasks.

The integrated circuit fabrication system 900 enables interaction among the entities for the purpose of integrated circuit (IC) manufacturing, as well as the advanced processing control of the IC manufacturing. In an embodiment, the advanced processing control includes adjusting the processing conditions, settings, and/or recipes of one processing tool applicable to the relevant wafers according to the metrology results.

In another embodiment, the metrology results are measured from a subset of processed wafers according to an optimal sampling rate determined based on the process quality and/or product quality. In yet another embodiment, the metrology results are measured from chosen fields and points of the subset of processed wafers according to an optimal sampling field/point determined based on various characteristics of the process quality and/or product quality.

One of the capabilities provided by the IC fabrication system 900 may enable collaboration and information access in such areas as design, engineering, and processing, metrology, and advanced processing control. Another capability provided by the IC fabrication system 900 may integrate systems between facilities, such as between the metrology tool and the processing tool. Such integration enables facilities to coordinate their activities. For example, integrating the metrology tool and the processing tool may enable manufacturing information to be incorporated more efficiently into the fabrication process or the APC module, and may enable wafer data from the online or in site measurement with the metrology tool integrated in the associated processing tool.

In summary, the present disclosure provides devices and methods for detecting miniature targets in a fluid sample. In one aspect, the present disclosure implements one or more multiple voltage reference transistors that surround a sensing transistor in different directions. In another aspect, the present disclosure implements different gate structures for the multiple voltage reference transistors, for example, gate structures with different material compositions, thicknesses, or lateral dimensions for their respective gate dielectric layers. The present disclosure also utilizes the voltage reference and sensing transistors and the application of various types of AC, DC, and pulsing voltages to selectively detect a particular type of miniature target from a fluid sample that contains different types of miniature targets.

The present disclosure may offer advantages over conventional devices. However, it is understood that not all advantages are discussed herein, different embodiments may offer different advantages, and that no particular advantage is required for any embodiment. One advantage is that the improvement in sensitivity. For example, by implementing multiple different voltage reference transistors around a single sensing transistor, or by implementing a single large voltage reference transistor to circumferentially surround the single transistor, a more stable voltage reference may be provided. The more stable voltage reference in turn allows the sensing transistor to detect the miniature targets with greater accuracy and sensitivity.

In addition, in embodiments where the transistors from adjacent sets are spaced farther apart than transistors within the same set (see FIG. 17), the sensing transistor of each set is less susceptible to the electrical noise produced by transistors from adjacent sets. Likewise, in embodiments where the sets of transistors are laterally offset, such that the sensing transistor between adjacent sets are misaligned with one another (see FIG. 18), the sensing transistor of each set is also less susceptible to the electrical noise produced by transistors from adjacent sets. The reduced susceptibility to the electrical noise also translates into better sensitivity of the sensing transistors.

Another advantage is that some embodiments of the present disclosure can reduce the likelihood of air bubbles being trapped in the fluid sample. For example, in embodiments where the patterned structure defines a rounded opening for collecting the fluid sample (see FIG. 16B, where the opening 340 has a rounded boundary 410), the lack of angular corners means that the fluid sample can be collected by the opening 340 without trapping air bubbles therein. The reduction of air bubbles may also lead to better sensitivity and/or accuracy of the device.

Yet another advantage is that the present disclosure can selectively sense a particular type of miniature target from a fluid sample that contains multiple types of miniature targets. This may be achieved by selectively applying AC or DC voltages to different voltage reference transistors (see FIGS. 19A-19B through 24A-24B), depending on the electrical polarity of the different types of the miniature targets, as well as the type of miniature target to be sensed. In embodiments where an oscillating electric field is used to achieve the selective sensing, the present disclosure may also configure the different voltage reference transistors to have different material compositions (see FIG. 25) or different thicknesses (see FIG. 28), which may further bolster the oscillating electric field.

Other advantages may include compatibility with existing fabrication processes (including for 2-D planar devices, FinFET, and GAA processes) and the ease of implementation.

One aspect of the present disclosure pertains to a device. The device includes a substrate having a first side and a second side. The first side and the second side are vertically opposite to one another. A sensing transistor is disposed at least in part over the first side of the substrate. A plurality of voltage reference transistors is disposed at least in part over the first side of the substrate. The voltage reference transistors are disposed on different lateral sides of the sensing transistor. A structure is disposed over the second side of the substrate. The structure defines one or more openings configured to collect a fluid. A sensing film is disposed over the second side of the substrate, wherein the sensing transistor is configured to detect, at least in part through capacitive coupling, a presence of one or more predefined miniature targets in the fluid that attach to the sensing film in the opening that is vertically aligned with the sensing transistor.

Another aspect of the present disclosure pertains to a device. The device includes a substrate having a first side and a second side. The first side and the second side are vertically opposite to one another. A sensing transistor is disposed at least in part over the first side of the substrate. A voltage reference transistor is disposed at least in part over the first side of the substrate. The voltage reference transistor circumferentially surrounds the sensing transistor in 360 degrees in a top view. The voltage reference transistor is configured to provide a reference voltage. A sensing film is disposed over the second side of the substrate. A patterned structure is disposed over the second side of the substrate. The structure defines an opening that exposes a portion of the sensing film. The opening is configured to collect a fluid sample that contains one or more predefined miniature targets. The sensing transistor is configured to detect the one or more predefined miniature targets.

Yet another aspect of the present disclosure pertains to a method. A device is provided that includes a first voltage reference transistor, a second voltage reference transistor, and a sensing transistor each formed at least partially over a first side of a substrate. The first voltage reference transistor and the second voltage reference transistor surround the sensing transistor in different directions. A fluid sample is collected in a first opening, a second opening, and a third opening defined by a patterned structure over a second side of the substrate. The fluid sample contains at least a first type of miniature target and a second type of miniature target different from the first type. The first opening, the second opening, and the third opening are aligned with the first voltage reference transistor, the sensing transistor, and the second voltage reference transistor, respectively. The first type of miniature target is forced to the second opening while the second type of miniature target is repelled away from the second opening. This is performed at least in part by applying a first voltage to the first voltage reference transistor and applying a second voltage to the second voltage reference transistor. Via the sensing transistor, a presence of the first type of miniature target is detected in the second opening.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A device, comprising:
a substrate having a first side and a second side, wherein the first side and the second side are vertically opposite to one another in a cross-sectional side view;
a sensing transistor disposed at least in part over the first side of the substrate in the cross-sectional side view;
a plurality of voltage reference transistors disposed at least in part over the first side of the substrate in the cross-sectional side view, wherein a first subset of the voltage reference transistors are disposed adjacent to the sensing transistor in a first direction in a top view, and wherein a second subset of the voltage transistors are disposed adjacent to the sensing transistor in a second direction different from the first direction in the top view;
a structure disposed over the second side of the substrate in the cross-sectional side view, wherein the structure defines one or more openings configured to collect a fluid; and
a sensing film disposed over the second side of the substrate in the cross-sectional side view, wherein the sensing transistor is configured to detect, at least in part through capacitive coupling, a presence of one or more predefined miniature targets in the fluid that attach to the sensing film in the opening that is vertically aligned with the sensing transistor.

2. The device of claim 1, wherein:
the first subset of the voltage reference transistors includes a first voltage reference transistor and a second voltage reference transistor;
the second subset of the voltage reference transistors includes a third voltage reference transistor and a fourth voltage reference transistor;
the first voltage reference transistor and the second voltage reference transistor are disposed immediately adjacent to the sensing transistor in the first direction in the top view; and
the third voltage reference transistor and the fourth voltage reference transistor are disposed immediately adjacent to the sensing transistor in the second direction in the top view.

3. The device of claim 1, wherein the one or more opening include a plurality of openings, and wherein at least one of the openings is vertically aligned with the sensing transistor or with a respective one of the voltage reference transistors.

4. The device of claim 1, wherein the one or more predefined miniature targets including: an ion, a nucleic acid, a polarized molecule, an antigen, an antibody, an enzyme, a cell, a protein, a virus, or a bacterium.

5. The device of claim 1, wherein:
the device includes a plurality of sets of sensing transistors and voltage reference transistors, each set comprising a respective sensing transistor and two or more subsets of the voltage reference transistors that surround the sensing transistor in the first and second horizontal directions; and
a first distance separating the adjacent sets is greater than a second distance separating the sensing and voltage reference transistors within the set.

6. A device, comprising:
a substrate having a first side and a second side, wherein the first side and the second side are vertically opposite to one another in a cross-sectional side view;
a sensing transistor disposed at least in part over the first side of the substrate in the cross-sectional side view;
a voltage reference transistor disposed at least in part over the first side of the substrate in the cross-sectional side view, wherein a boundary between the voltage reference transistor and the sensing transistor extends continuously in a top view and circumferentially surrounds the sensing transistor in 360 degrees in the top view, and wherein the voltage reference transistor is configured to provide a reference voltage;
a sensing film disposed over the second side of the substrate in the cross-sectional side view; and
a patterned structure disposed over the second side of the substrate in the cross-sectional side view, wherein the patterned structure defines an opening that exposes a portion of the sensing film, wherein the opening is configured to collect a fluid sample that contains one or more predefined miniature targets, and wherein the sensing transistor is configured to detect the one or more predefined miniature targets.

7. The device of claim 6, wherein the opening has an oval or circular shape in the top view.

8. The device of claim 6, wherein the one or more predefined miniature targets including: an ion, a nucleic acid, a polarized molecule, an antigen, an antibody, an enzyme, a cell, a protein, a virus, or a bacterium.

9. The device of claim 6, wherein the sensing film contains hafnium oxide, tantalum oxide, or zirconium oxide.

10. The device of claim 6, wherein the boundary between the sensing transistor and the voltage reference transistor has an oval or circular shape in the top view.

11. The device of claim 6, wherein the opening is vertically aligned with the voltage reference transistor.

12. The device of claim 6, wherein the patterned structure contains an elementary semiconductor.

13. A device, comprising:
a substrate having a first side and a second side, wherein the first side and the second side are vertically opposite to one another in a cross-sectional side view;
a sensing transistor disposed at least in part over the first side of the substrate in the cross-sectional side view;
at least a first voltage reference transistor and a second voltage reference transistor disposed at least in part over the first side of the substrate in the cross-sectional side view, wherein the first voltage reference transistor and the second voltage reference transistor are disposed on different lateral sides of the sensing transistor in a first horizontal direction in a top view;
a third voltage reference transistor and a fourth voltage reference transistor disposed at least in part over the first side of the substrate in the cross-sectional side view, wherein the third voltage reference transistor and the fourth voltage reference transistor are disposed on opposite sides of the sensing transistor in a second horizontal direction different from the first horizontal direction in the top view;
a structure disposed over the second side of the substrate in the cross-sectional side view, wherein the structure defines at least a first opening, a second opening, and a third opening that are vertically aligned with the first voltage reference transistor, a sensing transistor, and a third voltage reference transistor in a cross-sectional side view; and a sensing film disposed over the second side of the substrate in the cross-sectional side view, wherein the sensing transistor is configured to detect, at least in part through capacitive coupling, a presence of one or more miniature targets that attach to the sensing film.

14. The device of claim 13, wherein the first voltage reference transistor and the second voltage reference transistor are disposed immediately adjacent to the sensing transistor in the first horizontal direction in a top view, and wherein the third voltage reference transistor and the fourth voltage reference transistor are disposed immediately adjacent to the sensing transistor in the second horizontal direction in the top view.

15. The device of claim 14, wherein the structure further defines a fourth opening that is vertically aligned with the third voltage reference transistor and a fifth opening that is vertically aligned with the fourth voltage reference transistor.

16. The device of claim 13, wherein at least one of the first opening, the second opening, or the third opening is configured to collect a fluid that contains the miniature targets, wherein the miniature targets including: an ion, a nucleic acid, a polarized molecule, an antigen, an antibody, an enzyme, a cell, a protein, a virus, or a bacterium.

17. The device of claim 1, wherein at least a first one of the voltage reference transistors has a different material composition than at least a second one of the voltage reference transistors.

18. The device of claim 17, wherein the first one of the voltage reference transistors and the second one of the voltage reference transistors have different types of gate dielectric material.

19. The device of claim 1, wherein at least a first one of the voltage reference transistors has a different dimension in the first horizontal direction or in the second horizontal direction than at least a second one of the voltage reference transistors.

20. The device of claim 1, further comprising a plurality of dielectric isolation components that extend vertically through the substrate, wherein:
   the sensing transistor is separated from adjacent ones of the voltage reference transistors by different ones of the dielectric isolation components;
   a first planar surface of the sensing film extends to a planar surface of the structure; and
   a second planar surface of the sensing film extends to planar surfaces of the dielectric isolation components.

* * * * *